US011803892B2

(12) United States Patent
Dalal et al.

(10) Patent No.: US 11,803,892 B2
(45) Date of Patent: *Oct. 31, 2023

(54) SYSTEMS AND METHODS OF PRODUCT IDENTIFICATION WITHIN AN IMAGE

(71) Applicant: Walmart Apollo, LLC, Bentonville, AR (US)

(72) Inventors: Ravi Kumar Dalal, Dallas, TX (US); Monisha Elumalai, Dallas, TX (US); Yogananda Domlur Seetharama, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,049

(22) Filed: Aug. 23, 2022

(65) Prior Publication Data

US 2022/0398644 A1 Dec. 15, 2022

Related U.S. Application Data

(63) Continuation of application No. 16/864,505, filed on May 1, 2020, now Pat. No. 11,468,491.

(51) Int. Cl.
*G06Q 30/00* (2023.01)
*G06Q 30/0601* (2023.01)
(Continued)

(52) U.S. Cl.
CPC ......... *G06Q 30/0631* (2013.01); *G06N 20/00* (2019.01); *G06V 20/20* (2022.01); *G06V 30/153* (2022.01); *G06V 30/10* (2022.01)

(58) Field of Classification Search
CPC .................................................. G06Q 30/0631
(Continued)

(56) References Cited

U.S. PATENT DOCUMENTS 8,249,347 B1 8/2012 Ramkumar
9,262,686 B1 2/2016 Singer
(Continued)

OTHER PUBLICATIONS

Aisyah, S., Fransiska, S. N., Simanjuntak, M., & Lubis, E. A. (2019). Food packaging search application from text image in android with deep convolutional neural network (DCNN) method. Journal of Physics: Conference Series, 1230(1) doi:https://doi.org/10.1088/1742-6596/1230/1/012078 (Year: 2019).*

(Continued)

*Primary Examiner* — Arielle E Weiner
(74) *Attorney, Agent, or Firm* — Fitch, Even, Tabin & Flannery LLP

(57) ABSTRACT

Some embodiments provide systems to identify products comprising: product vector database; a plurality of portable computing devices comprising a camera and a control circuit configured to: access an image captured by the camera; perform an optical character recognition on the image; apply a vector modeling rule to key text, generate a first query product vector and wirelessly communicate the first query product vector to the product recommendation system; the product recommendation system is configured to apply a vector evaluation rule to the first query product vector to identify a first product; and wirelessly communicate to the portable computing device the first product identifier; wherein the control circuit receives the first product identifier, accesses a product information, causes product information to be displayed; and causes the first product to be virtually added to a virtual cart.

20 Claims, 7 Drawing Sheets

(51) Int. Cl.
  *G06N 20/00* (2019.01)
  *G06V 30/148* (2022.01)
  *G06V 20/20* (2022.01)
  *G06V 30/10* (2022.01)

(58) Field of Classification Search
  USPC .................................................... 705/26.7
  See application file for complete search history.

(56) References Cited

U.S. PATENT DOCUMENTS

| | | | |
|---|---|---|---|
| 9,978,095 B2 | 5/2018 | Davis | |
| 10,860,898 B2* | 12/2020 | Yang | G06N 3/084 |
| 11,138,648 B2* | 10/2021 | Baxter | G06Q 10/083 |
| 11,257,049 B1* | 2/2022 | Durazo Almeida | G06V 30/413 |
| 11,468,491 B2 | 10/2022 | Dalal | |
| 2017/0132687 A1* | 5/2017 | Kim | G06F 16/3331 |
| 2018/0197223 A1 | 7/2018 | Grossman | |
| 2019/0114515 A1 | 4/2019 | Bhardwaj | |
| 2019/0156395 A1 | 5/2019 | Bessega | |
| 2021/0303614 A1* | 9/2021 | Yim | G06F 16/538 |
| 2021/0342914 A1 | 11/2021 | Dalal | |
| 2021/0407141 A1* | 12/2021 | Sharma | H04N 21/2351 |

OTHER PUBLICATIONS

Boyd, Clark; "Visual Search—The Ultimate Guide: Statistics, News, Trends, and Tips"; https://medium.com/@clarkboyd/visual-search-trends-statistics-tips-and-uses-in-everyday-life-d20084dc4b0a; updated Aug. 6, 2018; pp. 1-45.

Moore, Kaleigh; "Why More Retail Brands Are Launching Visual Search Tools"; https://www.forbes.com/sites/kaleighmoore/2019/09/04/why-more-retail-brands-are-launching-visual-search-tools/#56edf8821bda; Sep. 4, 2019; pp. 1-4.

Pettey, Christy; "Garner Reveals Top Predictions for IT Organizations and Users in 2018 and Beyond"; https://www.gartner.com/en/newsroom/press-releases/2017-10-03-gartner-reveals-top-predictions-for-it-organizations-and-users-in-2018-and-beyond; Oct. 3, 2017; pp. 1-4.

USPTO; U.S. Appl. No. 16/864,505; Notice of Allowance dated May 24, 2022; (22 pages).

Wikipedia; "Vector space model"; https://en.wikipedia.org/wiki/Vector_space_model; available as early as Feb. 14, 2020; pp. 1-5.

* cited by examiner

SYSTEMS AND METHODS OF PRODUCT IDENTIFICATION WITHIN AN IMAGE

CROSS-REFERENCE TO RELATED APPLICATION

This application claims the benefit of U.S. Provisional application Ser. No. 16/864,505, filed May 1, 2020, which is incorporated herein by reference in its entirety.

TECHNICAL FIELD

This invention relates generally to product identification.

BACKGROUND

A typical shopping experience at a retail store includes customers moving through the aisles shopping through tens of thousands of products or more to find products of interest. The customer then transports those products through the retail store to a point-of-sale system where the customer physically purchases the intended product.

BRIEF DESCRIPTION OF THE DRAWINGS

Disclosed herein are embodiments of systems, apparatuses and methods pertaining to identifying products. This description includes drawings, wherein.

Figure 1:
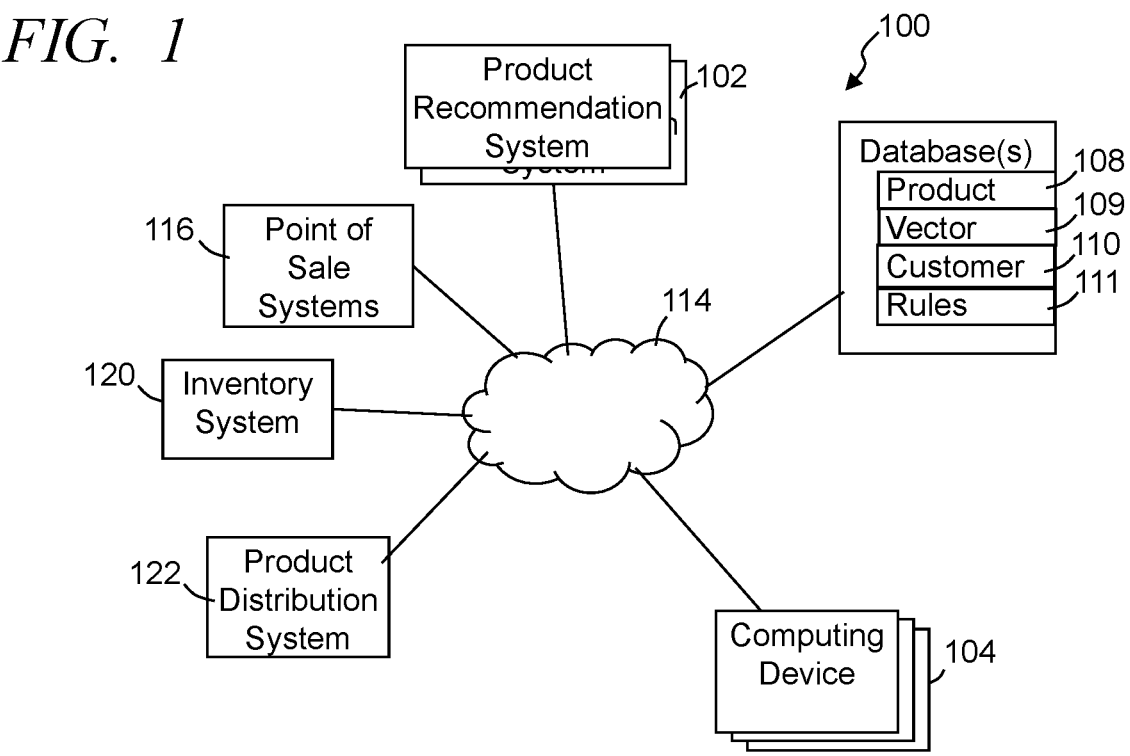
FIG. 1 illustrates a simplified block diagram of an exemplary product identification system to identify products captured by an image, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Systems and methods are provided that enable product recognition through customers' portable smartphones, tablets and other customer computing devices in a reduced time through simplified image processing and textual recognition. Further, the systems and methods improve the computational processing, reduce latency, reduce network bandwidth, and simplify product recognition. The product recognition, in some implementations, is further achieved without the use of secondary modes of identification, thus further reducing computation complexity and processing, while still achieving accurate results.

Some embodiments provide systems to identify products and include one or more product recommendation systems that communicatively couple, over one or more distributed computer networks, with one or more product vector databases and thousands of portable computing devices. The product vector databases store thousands or more of standardized product vectors. Each product vector numerically represents textual information on packaging of a respective one of thousands of products. Typically, the system further includes a plurality of point of sale systems that are communicatively accessed by the product recommendation systems and/or portable computing devices. The plurality of portable computing devices operate as network edge components, and include one or more imaging systems, one or more displays, one or more wireless transceivers, at least one control circuit and memory coupled to the control circuit. In some embodiments the memory stores a local product database and a software application.

The control circuit, when locally executing the software application, is configured to: access an image captured by the imaging system; and perform, locally on the portable computing device, an optical character recognition (OCR) on the image and identify a set of text from the image; apply, locally on the portable computing device, a first set of vector modeling rules to at least a subset of key text of the set of text, and generate a first query product vector from the at least the subset of key text; and wirelessly communicate the first query product vector to the product recommendation system without implementing another secondary mode of product identification and without communicating other product information from another secondary mode of product identification.

The product recommendation system is configured to receive the first query product vector, access the product vector database; and apply a first set of vector evaluation rules relative to the first query product vector in relation to the product vector database. Based on the first query product vector, the product recommendation identifies a first product determined to be captured in the image. A first product identifier is obtained of the first product, and wirelessly communicated to the portable computing device without communicating other product information of the first product. The control circuit of the portable computing device is further configured to: wirelessly receive the first product identifier from the product recommendation system determined based on the first query product vector; access, from the local product database, first product information exclusively corresponding to the first product identifier and comprising at least a first product name; cause at least a subset of the first product information to be displayed on the display; and cause the first product to be virtually added to a virtual cart corresponding to the customer associated with the portable computing device. The virtual cart, in some embodiments, is maintained locally on the portable computing device. Further, in some implementations, an application executed on the portable computing device and associated with the retailer may communicate with the remote customer database, a separate shopping server associated with the retailer, the product recommendation system and/or one or more other systems associated with the retailer to provide virtual cart information to be mirrored and stored remote from the portable computing device.

Some embodiments provide methods of identify products, comprising: accessing, by a control circuit of a portable computing device executing a software application, an image captured by an imaging system of the portable computing device; performing, locally on the portable computing device, an optical character recognition (OCR) on the image and identifying a set of text from the image; applying, locally on the portable computing device, a first set of vector modeling rules to at least a subset of key text of the set of text, and generating a first query product vector from the at least the subset of key text; and wirelessly communicating the first query product vector to a separate product recommendation system without implementing another secondary mode of product identification and without communicating other product information from another secondary mode of product identification; receiving, at the product recommendation system, the first query product vector, and accessing a product vector database that stores thousands of standardized product vectors, wherein each product vector numerically represents textual information on packaging of a respective one of the products; applying a first set of vector evaluation rules relative to the first query product vector in relation to the product vector database, and identifying, based on the first query product vector, a first product determined to be captured in the image; obtaining a first product identifier of the first product; wirelessly communicating to the portable computing device the first product identifier; wirelessly receiving, at the portable computing device, the first product identifier from the product recommendation system determined based on the first query product vector; accessing, from the local product database, first product information exclusively corresponding to the first product identifier and comprising at least a first product name; causing at least a subset of the first product information to be displayed on a display of the portable computing device; and causing the first product to be virtually added to a virtual cart corresponding to a customer associated with the portable computing device and which may be maintained locally on the portable computing device.

FIG. 1 illustrates a simplified block diagram of an exemplary product identification system 100 to identify products captured by an image, in accordance with some embodiments. The product identification system 100 includes one or more product recommendation systems 102 communicatively coupled, over one or more distributed computer and/or communication networks 114, with one or more databases, such as but not limited to retail product databases 108 and/or one or more vector databases 109. In some implementations, one or more of the product vector databases 109 are separate from the retail product database 108 to simplify access and evaluation of the product vectors. In other embodiments, however, the product vector database 109 is maintained within and/or part of the retail product database 108. The product recommendation system 102 is further in communication with and/or accessible by thousands of different portable computing devices 104, such as portable phones or smartphones, tablets, laptops and/or other such portable computing devices over the one or more computer and/or communication networks 114. The portable computing devices can be operated by customers in attempting to identify a product of interest (e.g., the customer intends to purchase the product, wants to obtain further information about the product, wants to obtain pricing information, wants to order the product, wants to notify a retail store of an out of stock or low stock situation, and other such instances), operated by a worker of a retail facility (e.g., in requesting stock levels, in identifying a proper location the product should be placed in the retail facility, in obtaining pricing information, in ordering a pick and/or restocking, and other such actions), and other people. For example, the portable computing device may be a smartphone owned and operated by a customer that is shopping at the retail facility, is at a friend's house, out at a restaurant, or other location and wants to obtain information about a product of interest and/or purchase a product of interest.

In some embodiments, the product identification system 100 further includes one or more additional databases, such as but not limited to one or more customer databases 110, one or more rules databases 111, one or more inventory databases, other such databases, and typically a combination of two or more of such databases. The customer database 110 includes at least customer profiles. Each customer profile, in some implementations, includes purchase history information, and may further include customer preference information corresponding to the respective customer. Many if not all of the customer profiles further include customer payment information corresponding to one or more modes of payment used to compete purchases (e.g., one or more credit cards, one or more debit cards, bank transfer information, gift card information, electronic payment methods (e.g., VENMO, PAYPAL, SQUARE, INC., etc.), other such methods, or a combination of such methods). The payment information may further define a priority or other instructions for when to use a particular payment method, limits, budgets, and/or other such information on the use of payment methods. Other profile information may additionally be included such as but not limited to one or more customer addresses, one or more customer delivery locations (which may be different than or the same as one or more of the customer addresses), age, birthdate, gender, ethnicity, retail stores visited, rates of consumption of one or more products, customer partiality vectors, other information, and typically a combination of two or more of such information.

These databases may be maintained within a single memory with one or more retail product databases 108 and/or one or more vector databases 109. In some embodiments, these databases are implemented through multiple different memory systems maintained across the one or more distributed computer and/or communication networks 114 providing distributed access, redundancy, reduced latency, reduced bandwidth and other such advantages. The product identification system 100 typically further includes one or more point of sale systems 116 that are each configured to receive or access payment methods and complete sales of products for one or more physical retail stores, and/or purchases over the Internet or other network. For example, multiple point of sale systems 116 are implemented in a physical retail store where customers shop, select products and complete purchases for products. In some embodiments, wireless communication may be established between a portable computing device 104 and one of the point of sale systems 116, and/or a point of sale system may wirelessly receive purchase commands that automatically activate and control the point of sale system to completion a purchase of one or more products selected by a customer.

The product identification system 100, in some implementations, further includes one or more inventory systems 120 that continuously track inventory over time and/or maintain one or more inventory databases. The inventory system 120 couples with the point of sale systems 116 to receive product sales information, such as but not limited to product identifying information, and in some implementations further includes quantity information of products purchased. The inventory system 120 makes adjustments to information and/or inventory levels based in part on the sales information. Similarly, the inventory system further tracks shipping and product distribution and/or delivery information to a retail store, tracks products routed for delivery to customers, and in some embodiments tracks product movement within a retail store (e.g., from a back storage area to the sales floor of the retail store to be available to customers), and uses such information to continuously monitor, track and update product count and inventory information. In some embodiments, the product inventory system 120 may be local at a retail store, while in other implementations, the product inventory system is implemented through multiple distributed systems and/or servers geographically distributed over the one or more computer and/or communication networks. In some embodiments, the product inventory system 120 may track inventory at a single retail store. In other embodiments, however, one or more product inventory systems 120 track inventory at multiple different retail stores, product fulfillment facilities, product distribution centers and/or other retail locations.

Some embodiments further include one or more product delivery and/or distribution control systems 122 that are communicatively coupled, over one or more communication and/or computer networks 114, with the point of sale systems 116, the product inventory systems 120, retail product database 108 and/or other sub-systems of the product identification system 100. The product distribution control system 122 receives purchase information requested to be delivered to defined delivery locations, and schedules and organizes the distribution of those ordered products. The product distribution control system 122 can include one or more conveyor systems, autonomous retrieval systems and other product movement systems to retrieve and stage products for delivery. Additionally, the distribution control system dictates the schedule of delivery vehicles (manned and/or unmanned), workers and other resources in the movement of products to the intended delivery locations.

Figure 2:
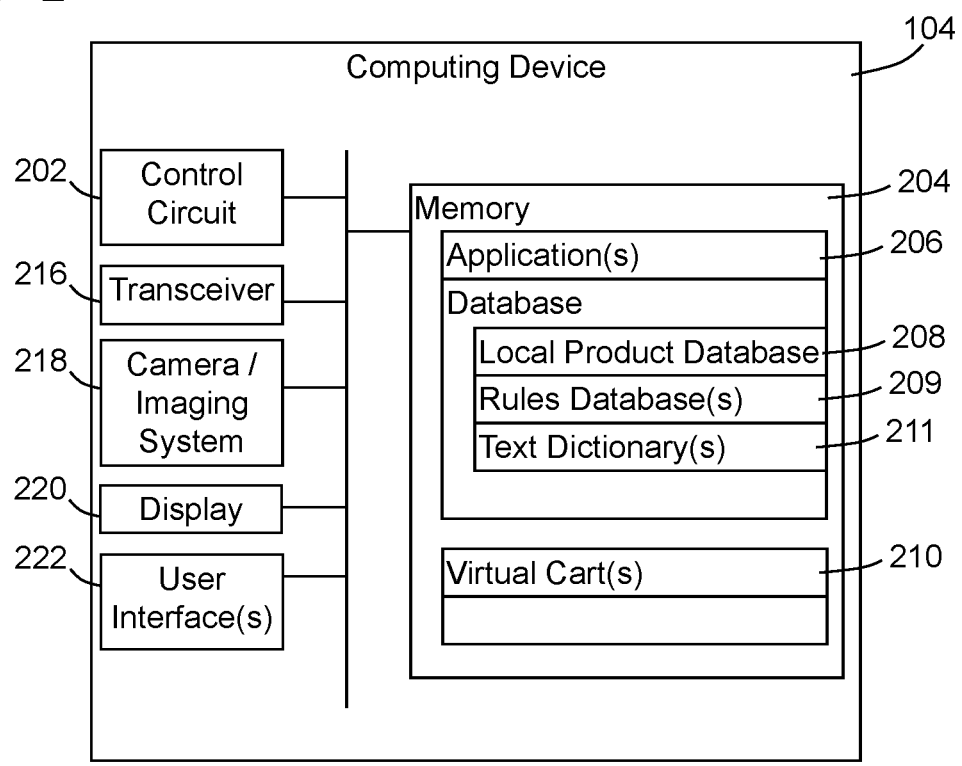
FIG. 2 illustrates a simplified block diagram of an exemplary portable computing device, in accordance with some embodiments.

FIG. 2 illustrates a simplified block diagram of an exemplary portable computing device 104, in accordance with some embodiments. The portable computing devices 104 are typically configured to operate as network edge devices or systems that in part capture and/or generate information and/or data, and provide information and/or data for consumption, such as being viewed, read, listened to, and/or otherwise utilized by a person. Similarly, the portable computing devices provide connections into networks and/or carriers (e.g., the Internet, cellular communication networks, WI-FI networks, BLUETOOTH networks, other such networks, or a combination of two or more of such networks). The product identification system 100 is configured to simultaneously communicate with tens of thousands of portable computing devices 104 or more through one or more servers, network routes, and/or other such devices, and enabling access to retail information, services, shopping and/or other such functionality.

Each portable computing device 104 includes one or more control circuits 202, one or more memory 204 within a single housing (not illustrated), and one or more communication transceivers 216. The control circuit is communicatively coupled with one or more of the memory 204 (e.g., via one or more communication busses, traces, and/or other such communication systems). The transceiver or transceivers 216 can provide wired and/or wireless communication (e.g., cellular, WI-FI, BLUETOOTH, radio frequency (RF), other such wireless communication, or a combination of two or more of such communications) over the one or more communication networks 114 and/or other computer and/or communication networks. Typically, the portable computing device 104 includes one or more cameras 218 or other imaging systems, and one or more displays 220, and one or more user interfaces 222. The user interface 222 may include one or more of the displays 220, which may be touch screen displays, one or more soft or displayed buttons, one or more physical buttons, track ball, stylus, other such user interfaces, or a combination of two or more of such interfaces. The memory 204 can be implemented through one or more internal and/or removable memory devices. Further, the memory 204 stores one or more a software applications, including a product recognition software application (APP) that includes or activates an optical character recognition (OCR), that are executed and/or implemented by the one or more control circuits 202. Additionally, the memory 204 locally stores on the portable computing device 104 at least a local product database 208.

The product identification system 100 improves response time and reduced network bandwidth while improving item recognition results by in part locally processing images to perform an OCR on images including or capturing products, and significantly reducing data that is remotely communicated to the central product recommendation system 102. In some embodiments, the control circuit 106 triggers at least one camera to capture one or more images of a product. Typically, the camera is triggered in response to an activation by the customer. In some embodiments, the product recognition APP directs and/or guides the customer to position a product of interest into a field of view of the camera and/or a predefined portion of the field of view of the camera, and activates the camera in response to a selection by the customer (e.g., a soft displayed button, a physical button cooperated with the housing of the portable computing device, etc.), or otherwise automatically triggers the camera (e.g., in response to determining camera detects a threshold level of focus to capture one or more images and/or video content, movement of the camera is less than a threshold, an item is within a predefined boundary of the field of view of the camera, other such factors, or a combination of two or more of such factors).

The recognition APP, through the control circuit 202 and/or an image processing system, accesses one or more images captured by the camera and automatically performs, locally on the portable computing device 104, an optical character recognition (OCR) on the image to identify a set of text from the image. Typically, the text recognition is automatically implemented without user and/or remote system interaction in response to capturing the image. The text of a product name, product characteristics, ingredients, weight, count, other such information captured from text on the product and/or packaging of the product of interest can be identified. The text can be substantially any words, phrases, string of words, strings of alphanumeric characters, individual alphanumeric characters, and/or other such relevant characters that are recognized as text. Similarly, the OCR can recognize text from one or more languages and/or writings, which can be dependent on a particular version of the OCR and/or the software application being implemented on the customer deice (e.g., based on a particular region where the application is expected to be used). Accordingly, the set of text recognized from the image may include one or more individual letters, one or more words, a set or series of words, one or more characters, one or more strings of characters, other such text, or a combination of two or more of such text.

In some embodiments, the product recognition APP and/or the control circuit further process the set of text recognized through the OCR to limit and/or extract the text that is/are more relevant and expected to aid in identifying a product of interest captured in the processed image or images. Some embodiments access a rules database 209 and apply a set of one or more filtering rules to the set of text based on a limited dictionary 211 of predefined text. The dictionary 211 of predefined text limits and focuses the identified text.

In some embodiments, the dictionary 211 is established, in part, by performing optical character recognition on substantially all products offered for sale by a retailer, and this text data is evaluated to identify particular text that is more relevant and can more accurately identify and/or distinguish different products. The limited dictionary 211 that is more relevant to a particular user, in some embodiments, is generated based on a limited and reduced set of the text from the products offered for sale in order to reduce processing and enhance a likelihood of identifying products. As such, in some embodiments, the limited dictionary 211 of predefined text comprises predefined text present on products offered for sale by a predefined retailer, while excluding generic text that are not expected to aid in distinguishing products from other products, while keeping some generic text when defined as part of a series of text that is expected to distinguish between different products. Typically, this limited dictionary of predefined text is stored locally on the portable computing device, and accordingly is limited so as to not utilize excess amounts of memory of the portable computing device. Still further, in some embodiments, the limited dictionary 211 is limited to be more relevant to the particular customer associated with the portable computing device 104, such as based on historic purchases by that customer.

The product recognition APP can apply filtering to the set of text identified through the OCR of the product of interest and filter out those text that are not identified in the dictionary 211 of predefined text. As such, in some embodiments, all of the set of text identified on the product of interest may be identified as a subset of key text, while typically, a subset of the key text identified on the product of interest is obtained for use. The subset of key text typically is less than the set of text identified from the image, and in some embodiments includes text only included in the dictionary 211 of predefined text. Other embodiments may include text not identified in the local dictionary 211, such as text that meet predefined criteria. For example, a text may be kept when the text includes a greater than a threshold number of alphanumeric characters, not included in an additional predefined dictionary of text to exclude, a text that is expected to be part of a longer string, other such criteria, or a combination of two or more of such criteria. Again, the predefined text may be individual characters and/or alphanumeric characters, sets of characters, individual words, sets of words, etc. Further, in some instances, the subset of text is defined or defined as a document. In some embodiments, the document is defined based solely on the subset of text. In other embodiments, this document may include positioning information of individual text of the subset of text as positioned in the image relative to other text of the subset of text, orientation of individual text of the subset of text and/or orientation of individual text relative to other text of the subset of text, size of text relative to size of other text of the subset of text, spacing and/or distances between text of the subset of text relative to size of the text of the subset of text, other such criteria, or a combination of two or more of such criteria.

In some embodiments, the product recognition APP further causes the control circuit 202 of the portable computing device 104 to further apply, locally on the portable computing device 104, a set of vector modeling rules to at least the subset of key text of the set of text recognized from the image of the product of interest, and generate a query product vector from at least the subset of key text and/or defined text document. Typically, the application of the one or more rules of the set of vector modeling rules is automatically and autonomously activated by the product recognition APP without user interaction. Vector space modeling and/or term vector modeling is a known modeling technique that applies an algebraic model for representing text and/or text documents as vectors of identifiers, such as, for example, index terms. Typically, terms are substantially any text (e.g., individual alphanumeric characters, other characters, single words, keywords, or phrases, other such text, or a combination of such text). In some applications, when words are the terms defining the vector, the dimensionality of a vector is or is dependent on the number of words within the subset of text, and/or number of words of text filtered according to the predefined limited dictionary of predefined text and/or corpus. There are various known approaches to vector spaced modeling and the training of vector space models based on textual data and the present teachings are not overly sensitive to any particular selections in these regards. As such, some embodiments train the document based language model, text based language model and/or other text based model, according to the limited dictionary 211 of predefined words and automatically applies the model and/or modeling rules, without user interaction, to the subset of key text to generate one or more query product vectors to numerically and/or algebraically represent the subset of key text and/or the document generated form the subset of key text.

The resulting query product vector or query product vectors are wirelessly communicated through one or more transceivers 216 of the portable computing device 104 to the product recommendation system 102. Typically, the query product vector is communicated automatically without user interaction. Additionally, the query product vector is typically communicated without implementing another secondary mode of product identification and without communicating other product information from another secondary mode of product identification (e.g., without RFID tag information, barcode scan information, etc.). Accordingly, some embodiments simplify the computational processing while further reducing network bandwidth by solely utilizing OCR of an image locally on the portable computing device 104, and locally generating the query product vector. The query product vector is significantly less data than the image, and in some instances less than 2% of the data of the image. Similarly, the query product vector is typically less data than communicating the set of text or even the subset of text detected through the OCR of the image. As such, the product identification enables local processing on the portable computing device 104 to increase processing speed, and generates a query product vector that is communicated with much less data resulting in significant reduction in bandwidth usage as well as significantly reducing latency.

The product recommendation system 102 receives the one or more query product vectors from the portable computing device 104. Typically, the query product vector is communicated via wireless communication over one or more of the computer and/or communication networks 114. Accordingly, the product recommendation system 102 includes one or more wired and/or wireless transceivers. The product recommendation system 102 further automatically accesses the product vector database 109 in response to receiving the query product vector. The product vector database 109 stores thousands and typically tens of thousands or more of standardized product vectors that each numerically represent textual information on known packaging of a respective one of the tens of thousands or more products that the retail entity offers for sale. The standardized product vectors can be generated based on one or more images captured and represent a standard or ideal image of the product. OCR is applied to these one or more standard images to generate a set of text. In some embodiments, the set of text can be filtered according to one or more limited dictionaries of predefined terms. Vector space modeling can be applied to each set of text and/or each subset of filtered text, to generate a standardized or idealized vector.

Again, the product recommendation system 102 automatically accesses the product vector database 109 without user interaction, and typically in response to receiving the query product vector generated by the portable computing device 104. A set of vector evaluation rules are accessed from the rules database 111 and automatically applied relative to the query product vector received from the portable computing device in relation to the standardized product vectors maintained in the product vector database in order to identify a set of one or more of the standardized product vectors that most closely correlate with the query product vector received from the portable computing device 104 and generated from the text identified in the image of the product or other item (e.g., advertisement, sign, item held or being used by another person, etc.).

In some embodiments, the product recommendation system 102 identifies at least a first product that is determined and projected or estimated to be captured in the image based at least in part on a correlation of the received query product vector relative to at least a standardized vector exclusively corresponding to the first product. The correlation can identify one or more standardized product vectors that are within a threshold variation of the received query product vector, a standardized product vector that has a closest correlation with the received query product vector, and/or other such identified correlation. The vector alignment or correlation threshold may be determined over time and/or adjusted over time based on feedback from the customer, point of sale system, the product recognition APP, other such feedback, or a combination of such feedback. For example, the product recommendation system may obtain point of sale information after the customer has checked out after shopping, and using the information of the actual products purchased to modify the vector correlation threshold. Additionally or alternatively, the threshold may be dependent on an amount of variation there is between the received query product vector and one or more standardized product vectors. For example, when a received query product vector is particularly close to one standardized product vector, the threshold may be less than when the received query product vector is not as close to one particular standardized product vector. Other processing can be applied to identify the threshold to be applied. Some embodiments statistically evaluate over time correlations between received query product vectors and standardized product vectors for products actually purchased by the customer, and/or based on notifications of incorrect identification.

Some embodiments further identify when there are no products identified that are within the vector correlation threshold. As such, the product recommendation system 102, in some implementations, identifies when a query product vector received from the portable computing device 104 is not within a threshold of any of the standardized product vectors in the product vector database 109. Based on the lack of correlation, the product recommendation system, in some embodiments, communicates an error command to the portable computing device 104 to be received by control circuit 202. The error command, in some embodiments controls the control circuit 202 to displays a notification of the error. The error command may further control the control circuit to autonomously activate the imaging system to capture another image and/or activate a secondary mode of product identification. Alternatively or additionally, the error command may request another image be captured and/or a secondary mode of product identification be separately activated (e.g., barcode recognition, manual entry of a product identification number (e.g., barcode number, RFID tag number, etc.), and/or other modes of secondary identification.

In some embodiments, the product recommendation system 102 autonomously determines a relevance rankings of one or more different projected products by accessing and applying rankings rules. The ranking rules can include comparing and/or identifying deviations of at least angles between the query product vector received from the portable computing device 104 and each of one or more standardized vectors, from the product vector database, exclusively associated with one of the one or more different probable products that closely correlate with the received query product vector. In some implementations, the correlation between the query product vector received from the portable computing device is evaluated based on the elements or dimensions of the received query product vector relative to the corresponding the elements or dimensions of the standardized product vectors with the same or similar elements or dimensions.

In some embodiments, the rankings, additional ranking or other ordering, may further be dependent on one or more other factors, which may include for example, customer purchase history, customer preferences, recent popularity of products, customer location, inventory information, other factors, or a combination of such factors. In some embodiments, the product recommendation system 102 accesses one or more customer databases 110 that store thousands, and typically hundreds of thousands, of customer profiles. Each customer profile is associated with one of thousands, and typically hundreds of thousands, of different customers. As described above, each customer profile typically includes purchase history information, and in some instances customer preference information corresponding to the respective customer. The ranking can use the customer history information and/or preference information from the customer profile corresponding to the customer associated with the portable computing device 104 submitting the received product profile.

Again, a first product (or multiple products) can be identified and/or projected to be in the image captured by the portable computing device based on the correlation between the received query product vector and the respective standardized product vector corresponding to the first product (or the respective standardized product vector corresponding to each of the multiple identified products). Based identifying the first product, a first product identifier of the first product can be identified. In some embodiments, the product recommendation system 102 identifies a set of standardized product vectors from the product vector database that are within a threshold variation and/or deviation from the query product vector received from the portable computing device. The variation, in some embodiments, is based on a similarity of one or more elements of the vector, based on an angular deviation between the query product vector and the different standardized product vectors, other such correlations, or a combination of two or more of such correlations. There are various known approaches to determining relevance and/or correlation between vectors and/or text generated vectors, and the present teachings are not overly sensitive to any particular selections in these regards. For example, some embodiments may determine whether there is less than a threshold angular variation between vectors.

As described above, some embodiments may identify a set of one or more standardized product vectors that are within a threshold deviation of the query product vector received from the portable computing device 104. The product recommendation system 102 can utilize the identified set of one or more standardized product vectors to obtain a set of one or more product identifiers each corresponding to a respective one of the set of standardized product vectors. As such, in some instances the set of one or more standardized product vectors would include more than one product identifier corresponding to more than one standardized product vector (e.g., the first product identifier corresponding to a first standardized product vector, and a second product identifier corresponding to a second standardized product vector).

Some embodiments define and/or associate a preliminary ranking or weighting with one or more of, and typically each of these identified products. The ranking, in some implementations, is based on the amount or level of deviation between the query product vector received from the portable computing device 104 and a corresponding one of the standardized product vectors of the set of one or more standardized product vectors. The ranking of products corresponding to the set of identified standardized product vectors can additionally or alternatively be based on one or more other factors. For example, in some embodiments the product recommendation system 102 further accesses the customer profile corresponding to the customer associated with the portable computing device 104 that communicated the generated query product vector, and utilizes some of the customer profile information as at least part of the information used in generating and/or assigning the respective rankings. Some embodiments, for example, access the customer purchase history information corresponding to the customer associated with the portable computing device 140, and defines the ranking and/or weighting of each product of the set of identified products based at least on the customer profile information. As a further example, the ranking or weighting can be assigned to each product associated with a respective one of the set of product identifiers based at least on a variation between the query product vector and the corresponding standardized product vector, and the customer purchase history information. Again, other customer profile information may additionally or alternatively be applied in determining a ranking. For example, the product recommendation system 102 may consider a customer budget, discounts and/or sales of the same and similar products, customer location, inventory information, sales trends, other such information, or a combination of two or more of such information.

The product recommendation system 102 autonomously communicates the set of one or more product identifiers to the portable computing device 104 that communicated the query product vector. Further, the communication of the set of one or more product identifiers are typically wirelessly communicate to the portable computing device. The communication, in some implementations further includes commands to control the portable computing device to control the APP to display one or more predefined graphical user interfaces that include the relevant product information. In some embodiments, the product recommendation system in communicating the product identifiers of the one or more set of identified products to the portable computing device further communicates the associated rankings of the respective product identifiers of the set of one or more product identifiers to the portable computing device 104, but does not communicate other product information of the products corresponding to the set of product identifiers (e.g., without communicating a secondary identifying information, size, weight, quantity, and other such information). In some embodiments, current pricing information may further be obtained for one or more of the products in the set of one or more product identifiers and the pricing information can be communicated. For example, pricing information may be obtained and communicated when there has been a recent change (e.g., within a threshold time) to a pricing (e.g., "on-sale" pricing, available discounts, increase in pricing, etc.), the customer has not previously obtained pricing information for the identified product, pricing information for the identified product has not been communicated to the portable computing device within a threshold time, other such instances, or a combination of two or more of such instances. Further, the communication of the product identifier of the product does not include an image or graphical representation of the product. As such, the product recommendation system 102, in some implementations, limits the amount of information communicated to the portable computing device when communicating the set of product identifiers. By limiting the information communicated to the portable computing device 104, the product identification system 100 reduces network bandwidth usage, speeds the response time to the portable computing device 104, can enhance the reliability of the system, reduces computational overhead, enhances the operation of the portable computing device, and other such benefits to the product identification system 100.

In some embodiments, the portable computing device 104 receives, from the product recommendation system 102, the one or more product identifiers corresponding to the set of one or more identified products based on the query product vector communicated by the portable computing device 104 to the product recommendation system 102. When multiple product identifiers are communicated to the portable computing device, the portable computing device in some implementations further receives the set of product identifiers and the associated rankings from the product recommendation system 102. Typically, the product identifier or identifiers, and when relevant the ranking, are wirelessly communicated from the product recommendation system 102. The control circuit of the portable computing device 104 utilizes the one or more product identifiers received from the product recommendation system 102 and accesses, from a local product database 208 maintained on the portable computing device, product information exclusively corresponding to each of the received product identifiers. Typically, the product information includes at least a product name. In some embodiments, at least some of the product information for at least some of the products includes additional product information such as but not limited to one or more of: graphical images and/or pictures of the product that can be rendered on the display of the portable computing device 104, nutritional information, ingredients, net weight, count, quantity, size, use instructions or directions, advertising information, warnings, discount information, other such information, or a combination of two or more of such information.

In some embodiments, following the capturing of the image of the item and accessing the product information for one or more of the set of product identifiers, the portable computing device 104 causes at least a subset of the product information for at least one product of the set of one or more products identified to be displayed on the display 220 of the portable computing device 104. The displayed information, in at least some instances, can include a graphical representation, image or the like of the identified product. Typically, the graphical representation or image that is displayed is maintained in the local product database 208 stored on the customer, worker or other computing device 104. The local product database further stores and associates a product name and/or identifier with the respective graphical representation and/or image of the identified product. Some embodiments further store and associate one or more pricing of the identified product in the local product database 208. Other information may additionally or alternatively be displayed and/or a "link" to access other information over the distributed network 114 may be displayed.

In some implementations, when multiple product identifiers are received at the portable computing device in response to the communication of the query product vector, the portable computing device may limit the display of product information to one of the products while indicating other products were identified. In other embodiments, the product information for two or more of the product identifiers of the set of product identifiers are displayed and/or a scrollable listing of the multiple products can be displayed that includes one or more product identifiers of the set of product identifiers. Additionally, when product ranking is defined, some embodiments display the listing of the multiple products according to the ranking of each of the products. Some embodiments further display the ranking or other indication of the identified correlation between the query product vector determined based on the captured image and the products identified as potentially corresponding to that query product vector.

As described above, the portable computing device 104 typically includes one or more user interfaces 222, such as a touch screen display 220, physical buttons, touch pad, track ball, stylus, other such interfaces, or a combination of two or more of such interfaces. In displaying the list of one or more products and/or product identifiers, some embodiments enable the customer to touch a displayed button, link or other such soft button, and/or activate one or more physical buttons to select one or more of the identified products. In some embodiments, the control circuit 202 of the portable computing device 104 can detect and/or receive a selection of a displayed product by the customer based on the displayed product information for each of the set of product identifiers. This selection may cause additional product information about the selected product to be displayed, cause a graphical representation and/or an image of the product to be displayed, cause a graphical display to be enlarged, other such actions or a combination of two or more of such actions. In some embodiments, the selection of the displayed product, a portion of the product or a predefined option associated with the product (e.g., and "Add to Cart" option) can be detected by the control circuit 202, and the control circuit can cause, in response to receiving the selection, the product to be virtually added to the virtual cart 210 corresponding to the customer associated with the portable computing device 104. For example, an "add to cart" displayed button can be selected by a user, and the product be virtually added to the virtual cart in response to the detected selection. Some embodiments may include other information in the virtual cart, such as pricing, image, link to other information, other such information, or a combination of such information. In some embodiments, the virtual cart 210 is maintained locally on the portable computing device 104. In other embodiments, the virtual cart may additionally or alternatively be maintained remote from the portable computing device 104, and the control circuit 202 of the portable computing device can cause a notification to be communicated to cause the selected product to be virtually added to the virtual cart maintained remote from the portable computing device 104 (e.g., in the customer database 110, a virtual cart database, other such remote storage, or a combination of two or more of such remote storage). Accordingly, in some instances, the selected product is added by the portable computing device to a version of the virtual cart that is maintained locally on the portable computing device. The product recommendation system 102, in some embodiments, further causes a mirrored virtual cart, which is maintained remote from the portable computing device (e.g., in the customer database 110, cart database, other such storage, etc.), to be updated to include the selected product.

The compiled virtual cart 210 can further be utilized to enable the customer to purchase the products incorporated into the virtual cart. Some embodiments provide the customer, through the application executed by the control circuit 202 to initiate the purchase of the products within the virtual cart. For example, the application can cause a check-out or purchase option that can be activated by the customer (e.g., a check-out button displayed on the touch screen that can be selected by the customer). In some embodiments, the control circuit can cause a listing of products currently within the virtual cart to be displayed and enabling the customer to review the one or more products and/or the corresponding product information of the one or more products in the virtual cart, remove one or more products, adjust respective quantities of one or more products, review pricing of the products, access additional information, take other such actions or a combination of two or more of such actions.

In some embodiments, the activation of the check-out and/or a subsequent confirmation check-out option, the control circuit 202 can wireless communicate and/or otherwise cause the communication of the product identifying information and/or other relevant information to one or more point of sale system 116. In other implementations, the control circuit 202 can activate the product recommendation system 102, and/or another purchase system to communicate the relevant product identifying information and/or pricing to one or more point of sale systems 116. Additionally or alternatively, the control circuit can communicate an identification of the customer associated with the customer account and/or the computing device 104, and direct the point of sale system to access the virtual cart maintained remote from the portable computing device and acquire product identifying information and/or other information for the products included in the virtual cart. Typically, the point of sale system 116 is communicatively coupled over the computer network 114 with at least the retail product database 108 and the customer database 110, and is configured to obtain, from the retail product database, price information for the one or more products within the virtual cart and/or for the product identifiers received from the portable computing device 104.

One or more payment methods and/or corresponding payment information is obtained by the point of sale system 116. Typically, one or more methods of payment are stored within the respective customer profile associated with the customer corresponding to the virtual cart and/or the portable computing device 104 submitting the request to purchase the products in the virtual cart. Additionally or alternatively, the point of sale system may communicate with the portable computing device and request payment method information be provided and/or to select a method of payment when multiple methods are available. For example, the customer profile within the customer database 110 may store credit card information for one or more credit cards, debit card information for one or more bank debit cards, gift card information for one or more gift cards, bank transfer information for one or more bank accounts, one or more electronic payment and/or money transfer method information (e.g., VENMO, GOOGLE PAY, APPLE PAY, GLOBALPAY, PAYPAL, etc.), other payment methods, or a combination of two or more of such payment methods. The point of sale system 116 can utilize one or more methods to cause payment to be received through the one or more payment methods to complete a sale of one or more products in the virtual cart based on the price information of the one or more products. In some embodiments, the customer profile may specify an order of use of the methods of payment when more than one method of payment is available. In other embodiments, a request may be communicated to the portable computing device requesting the customer to select one of the methods of payment.

In some embodiments, the product recommendation system 102 may further identify one or more complementary and/or additional products that the customer may be interested in purchases. The identification of the complementary and/or additional products may be based on the one or more products identified based on the query product vector received from the portable computing device 104. Additionally or alternatively, the identification of one or more of the complementary and/or additional products may be based on the customer's purchase history, product vectors, customer partiality vectors, products being emphasized by a retail, products on sale by a retailer, other such factors, or a combination of one or more of such factors. In some embodiments, the product recommendation system 102 accesses a set of complementary product rules and applies one or more of the set of complementary rules to the retail product database 108 based on the identification of at least one of the product identifiers received from the portable computing device 104 and/or based on a customer profile corresponding to the customer associated with the portable computing device, and identifies a set of one or more complementary products that are each complementary to at least the one product identifier. The identification of complementary products can, for example, be based on products that are commonly purchased together, commonly used together, products that the specific customer commonly purchases together, other such factors, or a combination of two or more of such factors. There are various known approaches to identify complementary products and one skilled in the art will appreciate that one or more of these various different approaches or methods to identify complementary products can be applied in these regards. Based on the identified set of one or more complementary products, the product recommendation system can obtain corresponding product identifiers for each of the set of complementary products, and can communicate, typically wirelessly over the communication network 114, the product identifiers of the set of complementary products to the portable computing device 104.

Similar to the identifications of products corresponding to the query product vector, in some embodiments, the product recommendation system 102 accesses complementary ranking rules in the rules database and applies one of the complementary ranking rules to associate a ranking or weighting with each of the identified complimentary products. In some embodiments, the ranking includes accessing the customer profile corresponding to the customer associated with the portable computing device 104 that communicated the generated query product vector, and utilizes some of the customer profile information as at least part of the information used in generating and/or assigning the respective complementary product rankings.

Some embodiments, for example, access the customer purchase history information and/or product preferences information corresponding to the customer, and defines the ranking and/or weighting of each product of the set of identified complementary products based at least on the customer profile information. As a non-limiting example, products that are frequently purchased by the customer are ranked higher that products less frequently purchased together, products more rapidly consumed by the customer can be ranked higher than slower consumed products, products having a lower cost per use or cost per quantity (e.g., per unit weight, per unit volume, per count, etc.) can be ranked higher than similar and/or interchangeable products having greater cost per use or unit, products on discount may be ranked higher than similar and/or interchangeable products not on discount can be ranked higher, other such ranking rules or a combination of such ranking rules. Further, the ranking of one or more of the identified complementary products can be dependent on the number of products of the set of identified products (e.g., those products that are within the threshold variation of the query product vector) with which the complementary product is considered complementary (e.g., given a higher ranking when that complementary product is complementary to more than one product of the set of identified products).

Some embodiments apply ranking based on a correlation and/or variation with the received query product vector. In some embodiments, products that are complementary to higher ranking products identified as corresponding to the query product vector may similarly be ranked higher than complementary products that are complement to lower ranked products that are identified as corresponding to the query product vector. Ranking can, in some embodiments, be additionally or alternatively dependent on a customer budget, discounts and/or sales of the same and similar products, customer location, inventory information, sales trends, other such information, or a combination of two or more of such information There are various known approaches to ranking products, in addition to a level or degree of correlation between the query product vector and the standardized product vectors, relative to a customer's purchase history, preferences and/or interest, and one skilled in the art will appreciate that one or more of these various different ranking approaches can be applied in these regards.

In some embodiments, the product recommendation system 102 in communicating the set of complementary product identifiers to the portable computing device 104 further communicates the associated rankings of the respective product identifiers of the set of one or more complementary products to the portable computing device 104, but does not communicate other product information of the products corresponding to the set of complementary product identifiers (e.g., without communicating a secondary identifying information, size, weight, quantity, image, graphical representation, and/or other such information). In some embodiments, current pricing information may further be obtained for one or more of the complementary products communicated to the portable computing device and/or a point of sale system. For example, pricing information may be obtained and communicated when there has been a recent change (e.g., within a threshold time) to a pricing (e.g., "on-sale" pricing, available discounts, increase in pricing, etc.), the customer has not previously obtained pricing information for the identified product, pricing information for the identified product has not been communicated to the portable computing device within a threshold time, other such instances, or a combination of two or more of such instances.

Further, the communication of the complementary product identifier typically does not include an image or graphical representation of the complementary product. As such, the product recommendation system 102, in some implementations, limits the amount of information communicated to the portable computing device when communicating the set of product identifiers. By limiting the information communicated to the portable computing device 104, the product identification system 100 reduces network bandwidth usage, speeds the response time to the portable computing device 104, can enhance the reliability of the system, reduces computational overhead, enhances the operation of the portable computing device, and other such benefits to the product identification system 100.

As such, in some embodiments, the portable computing device 104 receives, from the product recommendation system 102, the one or more complementary product identifiers that are complementary to at least one of the set of one or more identified products, and when relevant the one or more rankings. The control circuit of the portable computing device 104 utilizes the one or more complementary product identifiers to access, from the local product database 208 maintained on the portable computing device, product information exclusively corresponding to each of the received complementary product identifiers. Typically, the product information includes at least a product name. In some embodiments, at least some of the product information for at least some of the products includes additional product information such as but not limited to one or more of: graphical images and/or pictures of the product that can be rendered on the display of the portable computing device 104, nutritional information, ingredients, net weight, count, quantity, size, customer use instructions or directions, advertising information, warnings, discount information, other such information, or a combination of two or more of such information.

In some embodiments, the control circuit 202 causes a listing of at least the complementary products to be displayed on the local display 220 of the portable computing device 104. For example, in some implementations, the control circuit cause a first listing to be displayed that includes the product information for each product identifier of the set of product identifiers identified as having a threshold correlation with the query product vector to be displayed on the display, and causes a second or complementary product listing of one or more complementary products to be displayed on the display that is separate from the first listing. The complementary product listing may be displayed simultaneously as the first listing, may be displayed below the first listing (e.g., in scrollable listings), or the like. In other instances, a customer may select an option (e.g., a "Complementary Products" option) displayed to activate the display some or all of the complementary product listing of the one or more complementary products. The complementary product listing can include the relevant product information for each of the complementary products (e.g., product identifiers, graphical representations, images, etc.). The entries in the first listing and/or complementary listing can be selectable options and/or include a corresponding option to add the respective product to the virtual cart. As such, the control circuit 202 can receive a selection, by the customer, of one or more of the complementary products, and cause, in response to receiving the selection of the one or more complementary products, the one or more complementary products to be virtually added to the virtual cart maintained locally on the portable computing device and/or remote from the portable computing device.

Some embodiments repeatedly monitor and/or apply measures to improve the identification of products and/or the virtual incorporation of relevant products into a virtual cart. For example, in some embodiments, the product recommendation system 102 further evaluates over time products purchased by the customer from the virtual cart and one or more products added to the virtual cart based on the product recognition from respective images and the text recognition (OCR) from the images. The text associated with each product purchased by the customer can be evaluated. This evaluation can include, in some implementations, accessing predefined stored text information in the product database 108 specific to the purchased products. Additionally or alternatively, the image and/or text obtained from the received from of the product can be further evaluated relative to the predefined text. Based on the evaluation of the text, the product recommendation system can identify a set of one or more customer relevant text from the text associated with the products purchased by the customer. The dictionary of predefined text maintained on the portable computing device 104 associated with the customer, can be caused to be updated over time based on the customer relevant text associated with the products purchased by the customer. The updating can include replacing one or more default text in the dictionary of predefined text with the customer relevant text while maintaining limits of the dictionary of predefined text, adding new text while maintaining limits of the dictionary of predefined text, other such updates, or a combination of such updates.

In some embodiments, the application executed by the control circuit 202 of the portable computing device 104, and/or the product recommendation system 102 evaluate product search terms used by a customer searching for a product through the application and/or a web browser. These search terms can be evaluated relative to potential terms that can be included in the dictionary 211 of predefined text. The evaluation can consider a number of times a term is used in a search, products actually purchased that correlate with on terms used in searches, relevance of a search term to one or more products repeated purchased by the customer or related customers, other such factors, or a combination of such factors. Still further, some embodiments utilize information from other customers to modify over time the dictionary 211 of predefined text. This can include identifying other customers that have a threshold relationship with the customer of interest, identifying other customers that have a purchase history that has a threshold correlation with the purchase history of the customer of interest, and/or other such factors.

Some embodiments additionally or alternatively utilize feedback to customize the training of vector model. The product recommendation system can, in some embodiments, evaluate over time products purchased by the customer. The retail product database 108 can be accessed and retrieve OCR text information corresponding to an exterior of each of the purchased products. The product recommendation system, or a model training system, can repeatedly train over time the text vector model using the OCR text information for each of the purchased products and customize the text vector model to the customer to provide an updated text vector model. The updated text vector models can be used, over time, to repeatedly replace the text vector model maintained local on the portable computing device and applied as part of the vector modeling rules. Some embodiments additionally or alternatively update over time the text vector model based on changes to the dictionary 211 of predefined text maintained local on the portable computing device 104. The updated model can be communicated to the portable computing device during times when there is reduced activity of the portable computing device and/or the one or more networks 114.

Figure 3A:
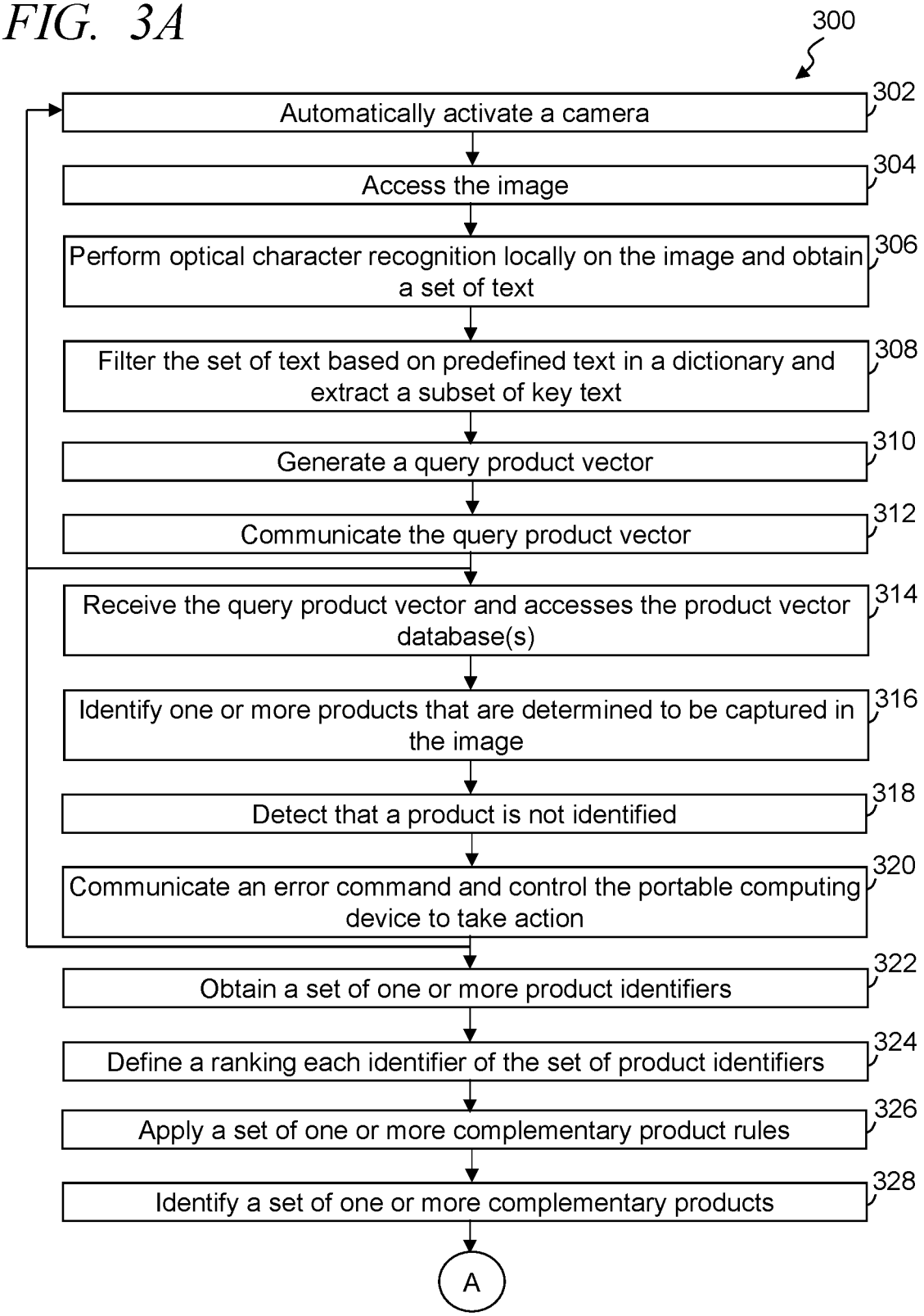
FIGS. 3A-3B illustrate a simplified flow diagram of an exemplary process of identifying products based on optical character recognition (OCR), in accordance with some embodiments.
Figure 3B:
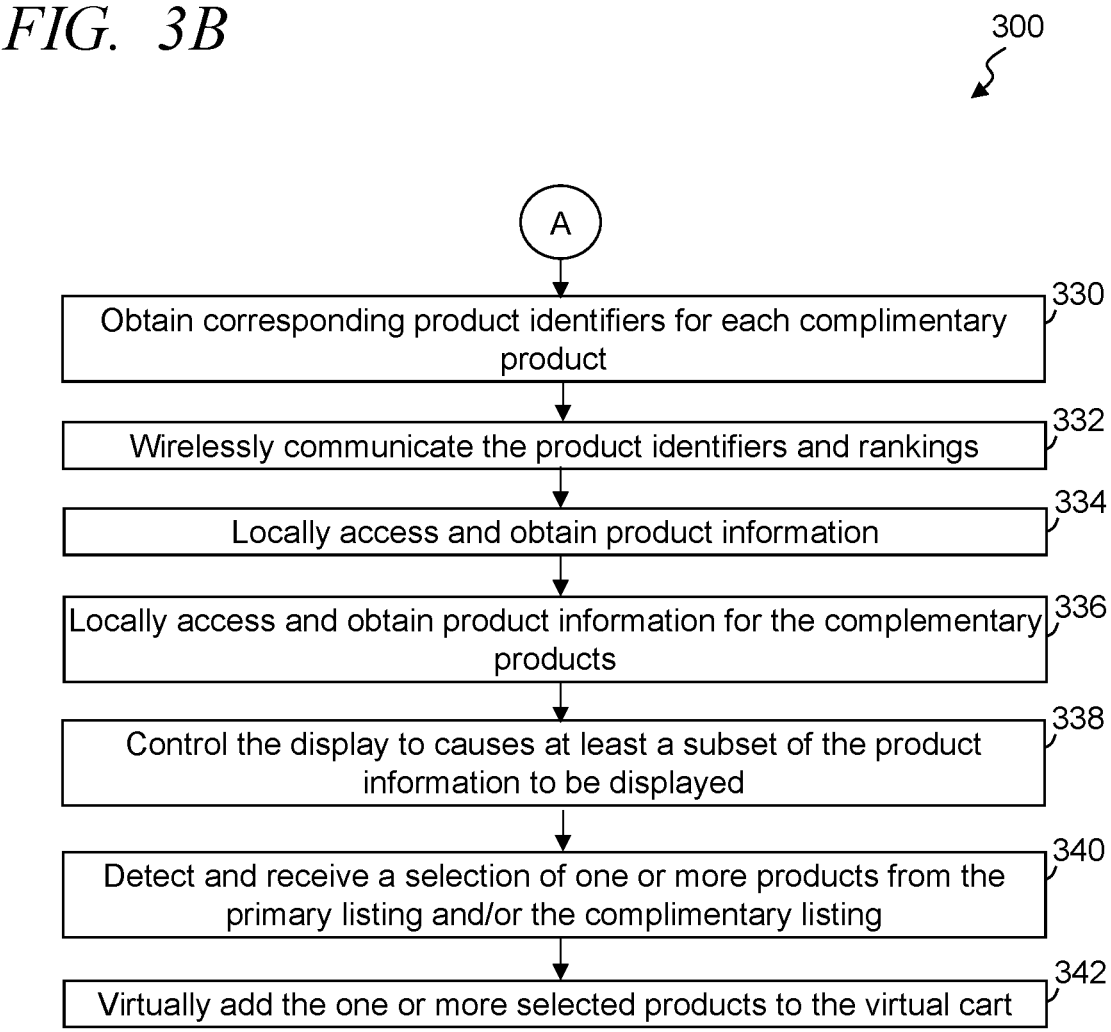

FIGS. 3A-3B illustrate a simplified flow diagram of an exemplary process 300 of identify identifying products based on optical character recognition (OCR), in accordance with some embodiments. The process is typically implemented in real time, providing identification of the product captured in the image within a couple of seconds or less. The process 300, in some implementations, includes optional step 302 where the control circuit 202 of the portable computing device 104, executing a software application 206, automatically activates one or more cameras 218 and/or other imaging system of the computing device 104 to capture one or more images of a product that the customer is interested in purchasing and/or about which the customer is interested in acquiring further information (e.g., price, quantity, ingredients, other such information, or a combination of two or more of such information). In step 304, the control circuit 202 accesses one or more images captured by the camera 218 of the portable computing device. The access may be in response to capturing the image, while in other instances, the image may be locally stored on the portable computing device and later accessed for processing.

In step 306, an optical character recognition (OCR) is autonomously performed, locally on the portable computing device, on the one or more images and a set of text is identified from the image. Again, the text can be substantially any relevant alphanumeric character, word, character, or other such text from one or more languages. Some embodiments include step 308 where a set of one or more filtering rules is applied, locally by the control circuit 202 of the portable computing device 104, to the set of text based on a limited dictionary of predefined text. The limited dictionary includes predefined text present on products offered for sale by a predefined retailer. The filtering further includes filtering the set of text based on the predefined text in the dictionary, and a subset of key text is extracted from the set of text identified from optical character recognition performed on the image. The subset of extracted key text is less than the set of text identified in the image, and includes text only included in the dictionary of predefined text.

In step 310, a set of vector modeling rules are autonomously applied, locally on the portable computing device 104, to at least the subset of key text of the set of text, and a query product vector is generated from at least the subset of key text. Some embodiments generate the query product vector based on all of the text that is detected through the OCR and is identified as relevant to product identification. Again, filtering may be applied to exclude some text. The computing device control circuit 202, in some implementations, may determine whether the previously generated query product vector is within a threshold of the just generated query product vector to obtain product identifying information stored local on the portable computing device in response to a previous image capture of the same product during an earlier shopping experience.

In step 312, the query product vector is communicated over the distributed communication network 114 to one or more separate product recommendation system 102 that are separate and distinct from the portable computing device 104. For example, the product recommendation system 102 may be implemented on one or more servers coupled with the Internet. In some embodiments, the communication of the query product vector is communicated from the portable computing device through wireless communication (e.g., WI-FI, BLUETOOTH, cellular, other such wireless communication protocols, standards and/or technologies, or a combination of two or more wireless communication protocols, standards and/or technologies). Further, in some embodiments, the query product vector is communicated without implementing another secondary mode of product identification and without communicating other product information from another secondary mode of product identification. As described above, limiting the communication to the query product vector without a secondary mode of identification, the image, a graphical representation and/or other information associated with the image and/or product attempting to be identified greatly reduced the amount of data communicated, reduces the speed of processing, reduces latency, and provides other advantages. It is noted, that although the query product vector is communicated without secondary identifying information, the communication of the query product vector can includes other information such as but not limited to information about the portable computing device 104 (e.g., a portable computing device identifier, communication protocol, network access information, etc.), customer identifying information, protection protocol information (e.g., encryption key, password/ passkey, etc.), other relevant information, or a combination of two or more of such information. This additional information enables the product recommendation system 102 to accurately communicate with the portable computing device 104, access relevant customer information, and/or other relevant actions to more effectively provide relevant information to the portable computing device 104 and the customer operating the portable computing device. Further, this additional information is significantly less than the amount of data needed to communicate the captured image for remote processing. This addition portable computing device and/or customer information would typically have to be communicated with any communication of an image and/or other information for remote processing. As such, the communication of the query product vector and additional information is significantly less than communicating an image for remote processing, and is typically less than 50% of the data to communicate an image, and in most instances is less than 10% of the data to communicate the image.

In some embodiments, the computing device 104 can optionally be activated again to repeat some or all of the above steps. Further, these steps may be repeated prior to receiving any response from the product recommendation system and/or after receiving one or more responses from the product recommendation system. For example, in some embodiments, the process returns to step 302 to capture an image of one or more other products that is of interest by the user.

In step 314, the product recommendation system 102 receives the query product vector, and accesses one or more product vector databases 108 that store the thousands of different standardized product vectors. Again, each product vector numerically represents textual information on a packaging of a respective one of the products. In step 316, set of one or more vector evaluation rules is applied relative to the query product vector in relation to the product vector database and the standardized product vectors, and based on the first query product vector the system attempts to identify one or more products that are determined to be captured in the image. In some embodiments, the identification, by the product recommendation system 102, of the product includes identifying a set of one or more standardized product vectors from the product vector database that are within a threshold variation of the query product vector. Based on the identification of the set of one or more standardized product vectors, the product recommendation system 102 obtains a set of product identifiers each corresponding to one of the identified standardized product vectors of the set of standardized product vectors.

Some embodiments include optional step 318 where the product recommendation system 102 detects that a product is not identified based on a query product vector. For example, the product recommendation system identifies when a query product vector received from the portable computing device is not within a threshold of any of the standardized product vectors in the product vector database. In step 320, an error command and/or notification can be communicated to the portable computing device 104 and control the control circuit 202 of the portable computing device to cause the display of the portable computing device to display a notification of the error. The error command may further control the control circuit to autonomously activate a secondary mode of product identification. Alternatively or additionally, the error command may request and/or recommend the use of a secondary mode of product identification to be separately activated to provide alternate and/or additional information that can be used to identify the product of interest captured in the image.

In step 322, a set of one or more product identifiers are obtained, from the product vector database 109, for each of the products of the set of one or more products identified as corresponding to the query product vector. Some embodiments identify and/or obtain a set of product identifiers, based on the identification of the set of one or more standardized product vectors and from the product vector database 109, for each product of the set of the identified products corresponding to one of the identified standardized product vectors of the set of standardized product vectors. Each product identifier of the set of one or more product identifiers corresponds to the product predicted to be captured in the image based on the received query product vector. The product identifier is obtained, in some embodiments, for each standardized product vector of the set of one or more standardized product vectors that are within the threshold variation of the query product vector. The product database 108 typically correlates the identified standardized product vector with a corresponding product identifier, such as through a table, link and/or other such correlation.

Some embodiments include step 324 where a ranking is defined for each product associated with a respective one of the set of one or more product identifiers. The ranking can be based on customer shopping history, customer preferences, location of customer at the time of image capture, product popularity, pricing, inventory levels, other such factors or a combination of two or more factors. In some embodiments, a customer purchase history information corresponding to the customer associated with the portable computing device is accessed through the customer database 110, to utilize customer purchase history information, customer preference information and/or other relevant information used to rank the set of identified products. The ranking to each product associated with a respective one of the set of product identifiers, in some implementations, is based at least on a variation between the first query product vector and the corresponding standardized vector, and the customer purchase history information.

Some embodiments include optional step 326, where a set of one or more complementary product rules are applied to the retail product database 108 based on the identification of at least one product identifier corresponding to the query product vector and a customer profile corresponding to the customer associated with the portable computing device communicating the query product vector. In step 328, a set of one or more complementary products is identified, where each complementary product is at least complementary to the identified product, or at least one of the set of one or more identified products. In step 330, corresponding product identifiers are obtained for each complementary product of the set of complementary products.

In step 332, the product identifiers for each of the set of one or more identified products, corresponding to and determined based on the query product vector, are wirelessly communicating from the product recommendation system 102 and wirelessly received by the portable computing device 104. As described above, some embodiments further provide a ranking of product identifiers when more than one product identifier is identified corresponding to the query product vector. As such, in some embodiments, the product recommendation system communicates the set of product identifiers and the associated rankings to the portable computing device without communicating other product information of products corresponding to the set of product identifiers. When set of complementary products are identified, the product recommendation system further communicates the product identifiers of the set of complementary products to the portable computing device and corresponding rankings when relevant.

In step 334, the portable computing device 104 accesses and obtains, from the local product database 208, product information exclusively corresponding to each of the product identifiers of the set of one or more product identifiers communicated from the product recommendation system 102 and predicted to be captured in the image. In some embodiments, step 336 is further included where the product identifiers of the set of complementary products are received, and accessing the local product database to obtain product information for each product identifier of the set of complementary products. The computing device control circuit 202, in some embodiments, may determine whether the received product information has previously been received a threshold number of times, and locally store the product information and associate it with one or more generated query product vectors. The locally stored information can allow the portable computing device to quickly obtain product information without communicating the query product vector when a generated query product vector is within a threshold variation of a previously generated and locally stored query product vector.

Some embodiments include step 338 where the control circuit 202 of the portable computing device automatically controls the display 220 to causes at least a subset of the product information for one or more of the product identifiers of the set of product identifiers to be displayed on the display 220 of the portable computing device. When rankings are provided some embodiments further cause the ranking to additionally be displayed and/or the products are displayed in an order according to the ranking of each of the products. Further, the listing of products can include one or more of the complementary products or a listing can be displayed on the display, which is separate from a primary listing. The secondary listing can include the product information for one or more of the complementary products.

Some embodiments include step 340 where the control circuit 202 of the portable computing device 104 can detect and receive a selection by the customer of one or more products from the primary listing and/or the complimentary listing based on the displayed product information for each of the set of product identifiers. In step 342, the control circuit 202, in response to receiving the selection, virtually adds the one or more selected products to the virtual cart 210 maintained locally on the portable computing device 104. As described above, in some embodiments, the control circuit 202 may autonomously control a transceiver 216 to communicate, over one or more communication networks 114 using one or more communication protocols, one or more commands and relevant product information to one or more external systems (e.g., the product recommendation system 102, a customer database 110, an inventory system 120, other such external system, or combination of two or more external systems) to control the external system to automatically, without user interaction, update a remote virtual cart associated with the customer, which may mirror the locally maintained virtual cart 210 stored on the portable computing device 104. Typically, one or more of the steps of the process 300 can be repeated for one or more images and/or products.

Figure 4:
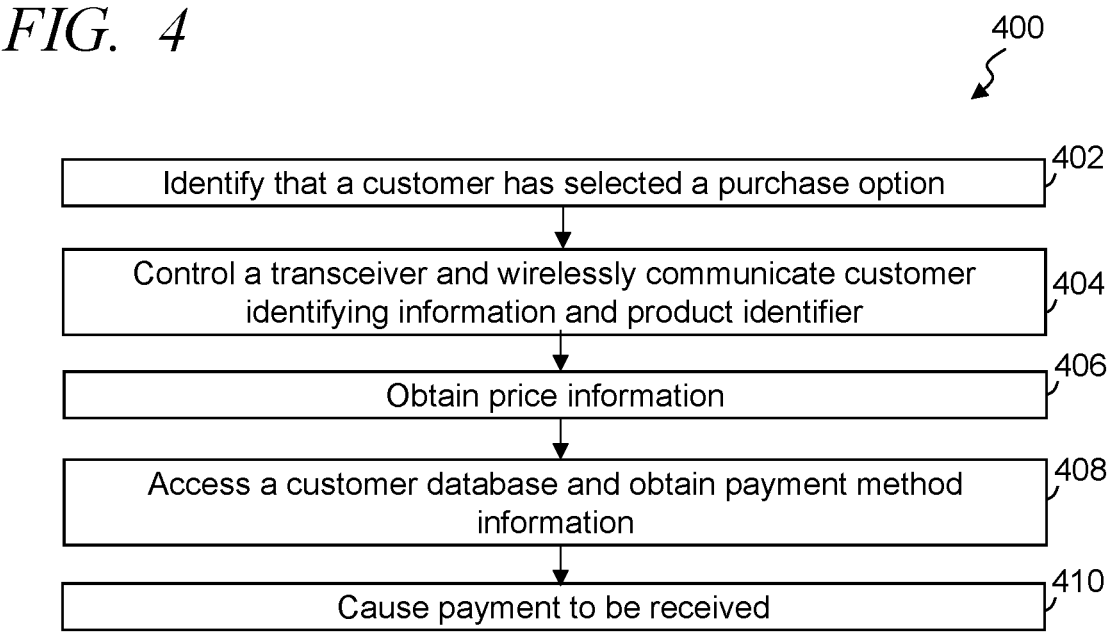
FIG. 4 illustrates a simplified flow diagram of a process of completing a purchase of one or more products, in accordance with some embodiments.

FIG. 4 illustrates a simplified flow diagram of a process 400 of completing a purchase of one or more products, in accordance with some embodiments. In step 402, the control circuit 202 of the portable computing device 104 identifies that a customer has selected a purchase option from the portable computing device. In some implementations, for example, the graphical user interface presenting the contents of the virtual cart may be displayed, and may include a check-out, purchase, or other such option that triggers the purchase of one or more products in the local virtual cart 210 and/or remotely maintained. The displayed virtual cart, in some implementations, may provide options to allow the customer to select one or more of the products in the virtual cart to be purchased, and/or select one or more options to postpone purchase of one or more products while non-selected products proceed to purchase in response to an activation of a check-out, purchase or other such option.

In step 404, the control circuit 202 of the portable computing device 104 controls at least one transceiver 216 to wirelessly communicate over one or more communication networks 114 customer identifying information of the customer associated with the portable computing device, and one or more product identifiers of products in the virtual cart to one or more point of sale systems 116 and one or more commands to control the point of sale system to implement and complete the purchase. Other product information may additionally or alternatively be provided to enable the point of sale system to accurately identify the product to be purchased. The customer identifying information may be a unique identifier of the computing device 104, a customer identifier specific to the retail entity, payment identifying information associated with the customer, other such identifying information, or a combination of two or more identifying information. Some embodiments additionally or alternatively communicate payment information to the point of sale system. For example, the application implemented by the control circuit 202 of the portable computing device 104 can control the display to display a purchase graphical user interface that optionally enables the customer to enter one or more methods or modes of payment (e.g., credit card information, gift card information, coupon information, an electronic mode of payment (e.g., VENMO, PAYPAL, etc.), other such modes of payment, or a combination of such modes of payment), and/or to direct that payment be obtained based on payment method information maintained in the customer profile stored in the customer database 110. In other instances, payment through the one or more payment methods maintained in the customer profile may be a default mode and the application can confirm the customer intends to use one or more of these modes of payment, or to select an alternate mode of payment.

In step 406, the one or more point of sale systems 116 autonomously obtain, in response to the command and product identifying information, price information for the identified one or more products. The pricing can be retrieved from locally stored information maintained and updated on the point of sale system, obtained from one or more retail product databases 108, retrieved from another source, or obtained from a combination of two or more sources. In step 408, the point of sale system 116 autonomously accesses a customer database 110, and using the customer identifying information obtains payment method information from the customer profile associated with the customer, and/or utilizes an alternate mode of payment, such as a mode of payment manually provided by the customer. In step 410, the point of sale system cause payment to be received through the payment method to complete the sale based on the price information of the one or more products. The receipt of payment can be through typical credit card transactions with a third party credit card company, debiting a gift card, communicating with a bank to cause a money transfer based on a debit card payment method, communicating payment notification to an electronic payment method, other such methods, or a combination of two or more of such methods.

The systems and processes can be available anytime a person is interested in identifying a product or other relevant item. Further, some embodiments continue, over time, to improve the operation of the system. Some of these improvements can be improvements specific to a particular customer or other user, based on the customer or user's interaction with and use of the system. In some embodiments, the system processes the interactions and purchases and applies feedback to customize the system, databases, rules and the like relative to a particular user.

Figure 5:
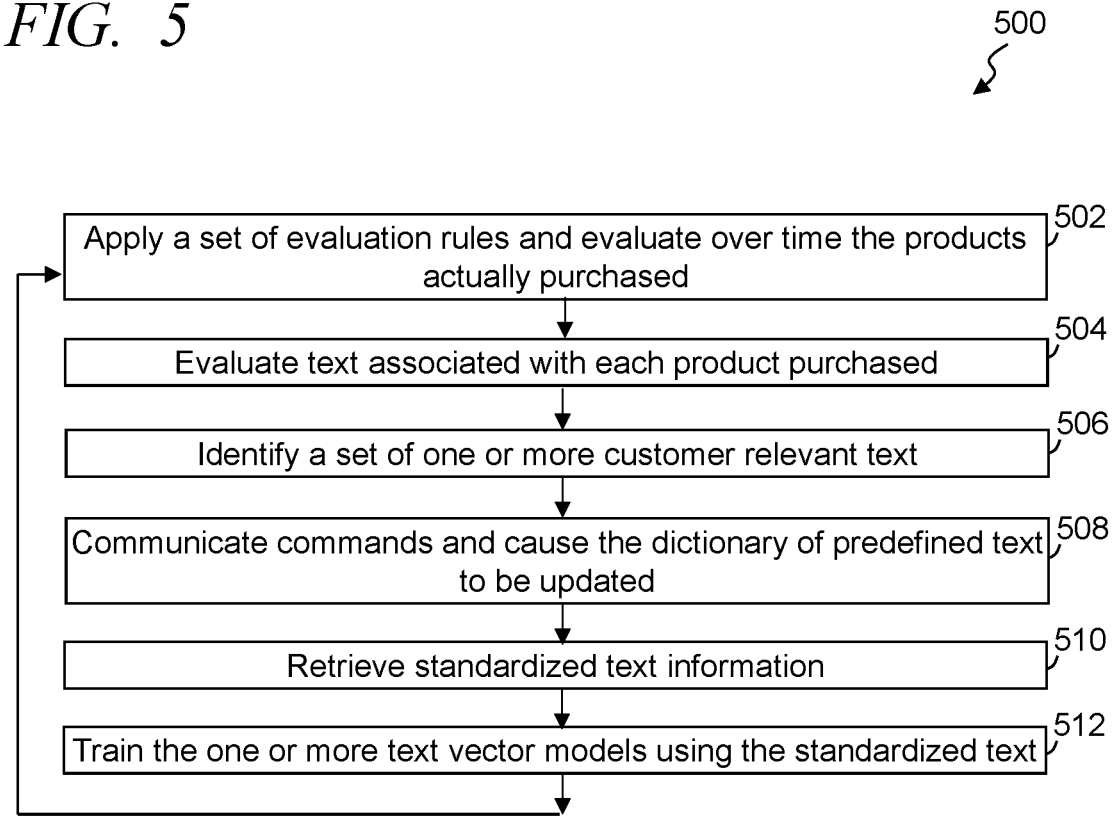
FIG. 5 illustrates a simplified flow diagram of an exemplary process of enhancing the system, in accordance with some embodiments.

FIG. 5 illustrates a simplified flow diagram of an exemplary process 500 of enhancing the system, in accordance with some embodiments. In step 502, the product recommendation system 102, an evaluation system and/or other relevant system or combination of two or more of such systems applies a set of evaluation rules to evaluate over time the products actually purchased by a particular customer. Typically, this evaluation includes identifying and/or distinguishing products actually purchased by the customer relative to those products the product recommendation system 102 identified based on respective query product vectors. Similarly, in some implementations, the application when controlling the display 220 to display the one or more product identifying information can further include one or more options to enable the customer to confirm a product listed is the actual product the customer was attempting to identify, enables the customer to notify the system that none of the identified products are the product attempting to be identified, other such options, or a combination of two or more of such options. Similarly, the application can detect that a customer does not select any of the products displayed and instead reactivates the system to capture another image, activates a different mode of identification, or other such action that can indicate an incorrect identification from the image of a product.

In step 504, text associated with each product purchased by the customer is evaluated based on the evaluation rules. These evaluations can include accessing a product database 108 and obtaining predefined key text that is predefined for that product and that is expected to be detected through the OCR process, accessing an ideal or standardized image of the product stored and performing an OCR process on the standardized image to detect text, and/or other such operations. In step 506, a set of one or more customer relevant text is identified, based on the evaluation of the text, from the text associated with the products purchased by the customer. This customer relevant text may include all of the predefined key terms, or may include a subset of one or more of the key terms based on a correlation of the predefined key terms relative to terms associated with the customer and/or the customer purchase history. This can include, for example, identifying in the customer purchase history that the customer typically purchases large or bulk products and as such the predefined key terms can be processed to include terms associated with a large size (e.g., a weight or weight threshold, a size, specific terms (e.g., "family size", "bulk", etc.), other such terms, or a combination of two or more of such terms).

In step 508, commands are communicated, over time, to the portable computing device 104 associated with the relevant customer to causing the dictionary of predefined text maintained on the portable computing device 104 to be updated over time based on the customer relevant text associated with the products purchased by the customer to replace one or more default text in the dictionary of predefined text with the customer relevant text while maintaining limits of the dictionary of predefined text.

In step 510, one or more retail product databases 108 are accessed and OCR ideal and/or standardized text information corresponding to an exterior of each of the purchased products is retrieved. In step 512, the one or more text vector models applied by the application on the portable computing device 104 are repeatedly trained over time using at least the OCR standardized text information for one or more of the purchased products to customize the text vector model to the customer to provide an updated text vector model, and repeatedly replace over time the text vector model, maintained local on the portable computing device and applied as part of the vector modeling rules, with the updated text vector model. The process 500 can be repeated any number of times based on one or more events (e.g., a purchase, a product return, a notification or detection that a product identified from an image is incorrect, a request from a customer, and/or other such events), a schedule, a detected threshold reduction in accuracy, other such factors or a combination of two or more of such factors. The process 500 can be repeated over time to improve the models and text identification over time. In some implementations, for example, the process 500 can be repeated based on a schedule, in response to a purchase, in response to a request by the customer, in response to a failure to identify a product, in response to a threshold number of failures to identify products, in response to a threshold number of failures to identify products over a threshold duration, other such triggers, or a combination of two or more of such triggers.

The process 300, 400 and 500 are described above as a series of multiple steps. It is noted that one or more of these steps may be omitted and/or may be conditional. Further, the order of the steps can be modified and reordered except for those steps that are dependent on a previous step. Similarly, one or more of the steps from one or more of the processes may be implemented simultaneously and/or repeated.

Figure 6:
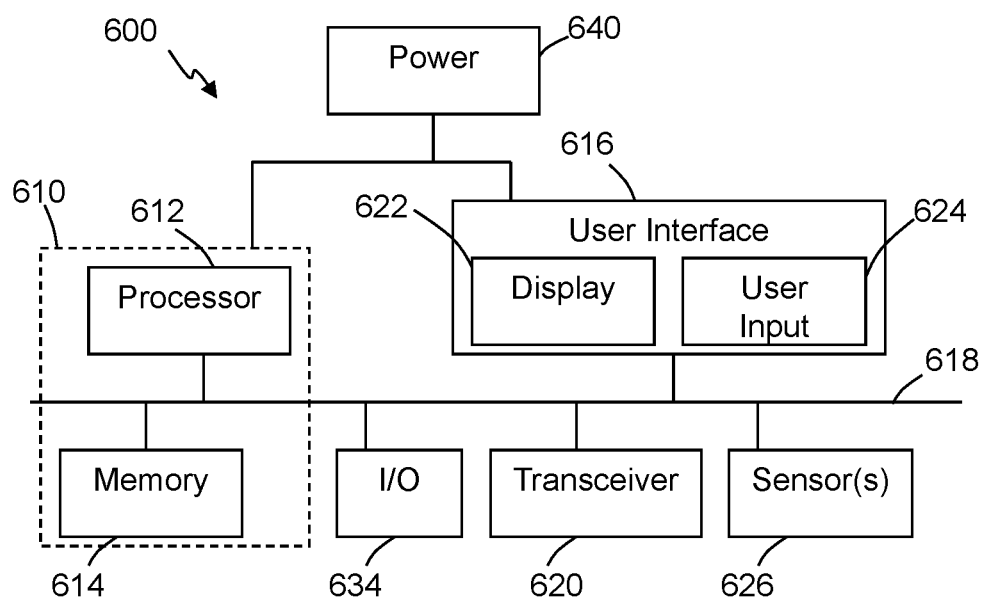
FIG. 6 illustrates an exemplary system for use in implementing methods, techniques, devices, apparatuses, systems, servers, sources and identifying products, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the system 100 of FIG. 1, and/or other above or below mentioned systems or devices, or parts of such circuits, circuitry, functionality, systems, apparatuses, processes, or devices. For example, the system 600 may be used to implement some or all of the product recommendation system 102, the computing device 104, the point of sale systems 116, the inventory system 120, the product distribution system 122, one or more of the databases, and/or other such components, circuitry, functionality and/or devices. However, the use of the system 600 or any portion thereof is certainly not required.

By way of example, the system 600 may comprise a control circuit or processor module 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store commands, instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system may implement the product recommendation system 102 with the control circuit being a product recommendation system control circuit, the computing device 104 with a computing device control circuit, a portable computing system 104 with a portable computing device control circuit 202, a point of sale system 116 with a point of sale control circuit, an inventory system with an inventory system control circuit, a product distribution system with a product distribution control circuit, and/or other components.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 114 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor-readable and/or computer-readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 114. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Some embodiments provide systems to enable the virtual populating and/or building of a virtual cart associated with a retail facility using visual search via Optical Character Recognition (OCR). The system addresses some of the shortcomings of image-based recognition, in part by reducing the time spent on data gathering, labelling and/or processing. Further, the system provides local OCR processing and the production of a representative query vector that can be wirelessly communicated. By generating the query vector, the system greatly reduces network bandwidth usage, latency, and data processing. In some embodiments, the system uses OCR technology to extract words from an image of an item captured in one or more images that are passed to a dictionary corpus filter and filters out and identifies keywords. One or more document-to-vector language model are applied in some embodiments to generate the query vector. The system can identify one or more relevant products that have a standardized product vector that corresponds to the query product vector. In some instances, complimentary products can be identified that are similar to the identified one or more products. The identified product, and when relevant the complementary products, are presents to the customer through the portable computing device. The portable computing device uses a local virtual catalogue of available products with the received product identifiers to obtain relevant product information for the identified one or more products and/or complementary products, which can be displayed, such as through one or more predefined graphical user interface templates.

In some implementations, the one or more products and/or complementary products are ranked by the system based on various factors like similarity to search terms, customer's purchase history, preferences, location, desired mode of receiving product, other such factors, and typically a combination of two or more of such factors. The ranking of the available products are, in some embodiments, determined for the customer by the system based on item similarity and members personalization. Based on the displayed one or more product information, a user then selects the one or more products from the displayed catalogue to add to the virtual cart. The customer can initiate a checkout of the cart to complete the purchase of the selected items. The system can be utilized while customers are moving through a retail store and shopping for products to purchase. Further, in some embodiments, the system operates while the customer is remote from the retail store and sees a product that the customer wants more information about and/or to purchase. In a non-limiting example, the customer may be at a restaurant and using a product that they enjoy and want to obtain further information and/or to purchase the product. As such, user can activate the application to capture an image, OCR the image and generate the query product vector and obtain the identification of the product from the product recommendation system. As another non-limiting example, the customer may be traveling down the street and see an advertisement for a product and can activate the application to obtain product information for one or more products that the product recommendation system determines has the predefined relationship with the query product vector generated through the OCR and modeling. In a further, non-limiting example, a customer may see a product in a movie or television show, or on an advertisement on a web site, and use the system to identify the product and/or purchase the product. In yet another non-limiting example, a worker at a retail store may be in the retail store and see a product that appears to be misplaced, and can use the application to obtain product information that can be used to identify where the product should be located within the retail store and/or use the product information to submit one or more other queries to obtain location information for that product. As such, the system can be utilized to identify products while in a retail store as well as outside of the retail store (e.g., see an advertisement for an item (e.g., consumable product, location, vacation, movie, theater, entertainment, etc.), see someone else consuming, using or otherwise holding an item, etc.).

Accordingly, some embodiments enable users to take a picture or upload an image of anything from anywhere from a mobile computing device. OCR can be applied and used to perform a search. The relevant search results can be accessed, and in some instances complementary items can similarly be identified. The user can select one or more identified products. In some embodiments, the recognition is limited to products offered for sale by a retailer, and/or within current catalogue of currently available products. This enables a user to quickly incorporate products into and/or build a virtual basket from captured images. Some embodiments apply the OCR and generate a query product vector. Accordingly, such systems do not utilize excess time gathering data, labelling and/or modeling of for image recognition. Instead, some embodiments are limited to the text identified through the OCR process. The query product vector is used to identify products that have similar standardized product vectors and/or are within a threshold variations. The threshold can be a fixed threshold specified based on testing and globally set, can be modified over time based on recognition for a particular customer, and/or other such adjustments.

Some embodiments provide systems to allow customers, workers and/or others to use an APP on their portable computing device (e.g., smartphone, tablet, laptop, or other mobile device) to take pictures and/or upload an image of anything from anywhere onto the computing device. The computing device locally processes the image to identify text on the product within the image based on Optical Character Recognition (OCR). The text is used to search for a corresponding product. The user is presented through the computing device with the relevant search results, and in some embodiments additionally presented with complementary items. In some embodiments, the items presented are item that are within a virtual catalogue of currently available products. Further, in some implementations, the virtual catalog is locally stored on the computing device. The user can select one or more items directly from the displayed search results and add items to their virtual cart or basket and "checkout" to complete a purchase of the selected product.

By using OCR technology, some embodiments avoids image based searching, which can greatly increase the time to communicate information, to search for relevant items, and return search results. In some embodiments, the system utilizes extracted text, words and the like detected through OCR to build a doc-to-vector language model query product vector. Identified products can initially be ranked based on a similarity between the query product vector and a corresponding standardized product vector. In some instances, complementary items can also be identified that are complementary or similar to the products identified from the search. The one or more available products that are identified can further be prioritized based on one or more factors. Typically, the prioritization is based in part on that customer's purchase history, preferences, and other relevant factors (e.g., location, desired mode of receiving the product, etc.). Accordingly, the displayed available products can be recommended based on item similarity and user personalization.

Figure 7:
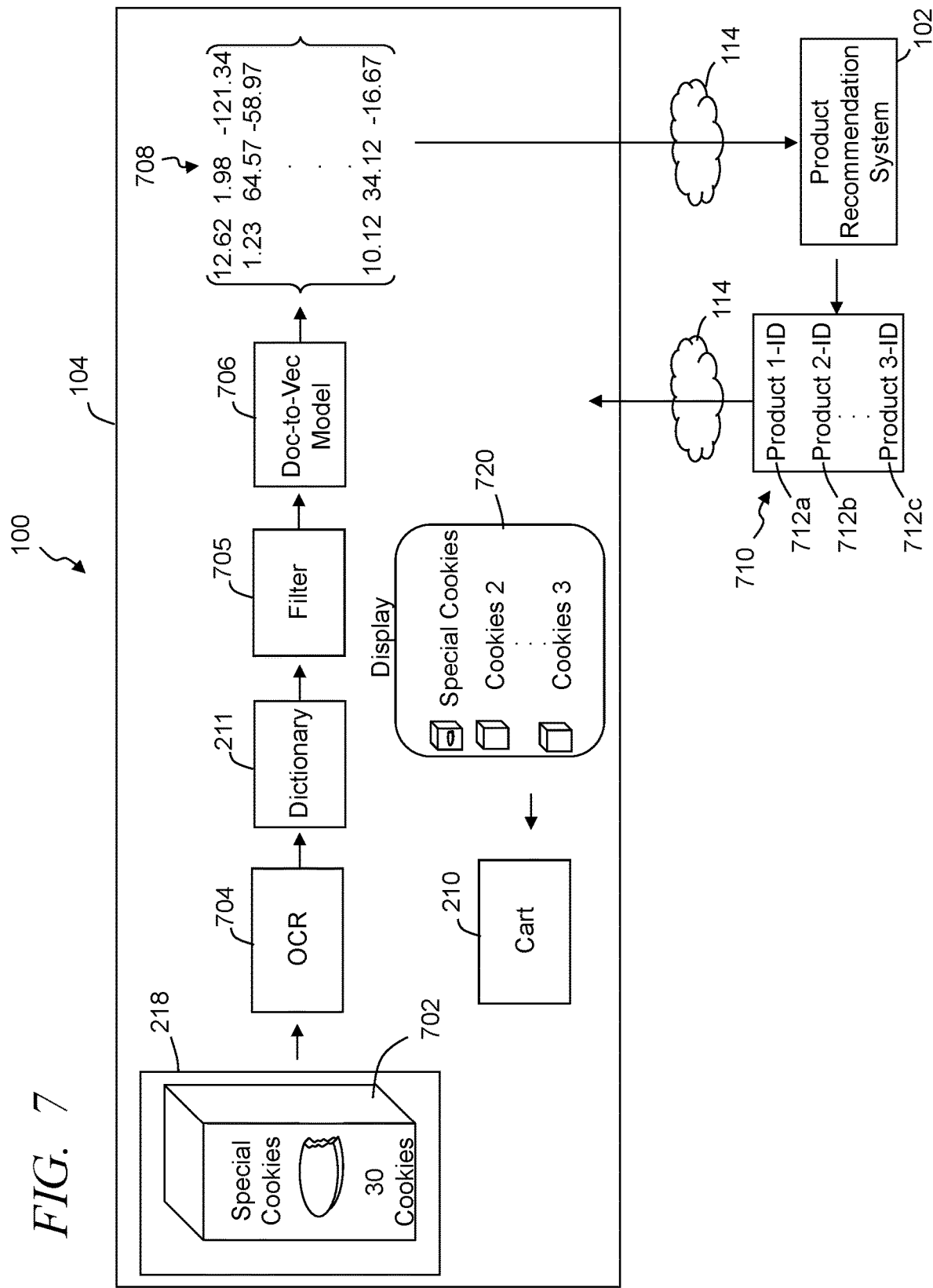
FIG. 7 illustrates a simplified block diagram of an exemplary product identification system to identify products captured by an image, in accordance with some embodiments.

FIG. 7 illustrates a simplified block diagram of an exemplary product identification system 100 to identify products captured by an image, in accordance with some embodiments. A portable computing device 104 automatically activates one or more cameras 218 of the computing device to capture one or more images that include one or more products 702. The computing device control circuit 202 applies an OCR application 704 to identify text from the image. The identified text is evaluated relative to one or more limited dictionaries 211 of predefined text to extract a subset of key text that includes of some or all of the identified from the image and that is expected to be relevant in identifying a product. Further, some embodiments apply one or more additional filtering rules 705 based on products offered for sale by the retail store and/or filtering based on a customer's purchase history and product purchased by the customer to further narrow the relevant text extracted from the image. In some embodiments, a model application 706 applies a set of vector modeling rules to at least the subset of key text of the set of text recognized from the image of the product of interest, and generates a query product vector 708 from at least the subset of key text and/or generates a defined text document. The computing device 104 communicates the query product vector 708 over one or more communication and/or computer networks 114 to the product recommendation system 102 that processes the query product vector 708.

In some embodiments, the product recommendation system 102 automatically accesses a product vector database 109 without user interaction and applies a set of vector evaluation rules relative to the query product vector and identifies a set 710 of one or more product identifiers 712a-c of the standardized product vectors (and/or the standardized product vectors) that most closely correlate with the query product vector 708, and in some instances optionally one or more additional complementary product identifiers for one or more complementary products. The set 710 of product identifiers are communicated over the same or different one or more communication and/or computer networks 114 to the portable computing device 104. The control circuit receives the set 710 of product identifiers 712a-c, and in some instances commands, and applies commands to display a predefined graphical user interface 720 that includes relevant product information (e.g., name, price, image, etc.) of one or more of products corresponding to one or more of the standardized product identifiers 712a-c and/or vectors of the set 710 of standardized product vectors. In some embodiments, the control circuit 202 of the portable computing device 104 utilizes the one or more product identifiers 712a-c received from the product recommendation system 102 and accesses, from a local product database 208 maintained on the portable computing device, product information exclusively corresponding to each of the received product identifiers 712a-c. Upon selection of one or more of the product representations and/or information, the control circuit can add one or more products to the virtual cart 210, which is maintained local on the computing device 104 and/or communicate an identifier of the selected product to be added to a remotely maintained virtual cart.

In some embodiments, systems are provided to identify products. Some of these systems comprise: product vector database storing thousands of standardized product vectors, wherein each product vector numerically represents textual information on packaging of a respective one of the products; a product recommendation system communicatively coupled over a distributed computer network with the product vector database; a plurality of point of sale systems; a plurality of portable computing devices operating as network edge components, wherein each portable computing device comprises a camera, a display, a wireless transceiver, a control circuit and memory coupled to the control circuit, wherein the memory stores a local product database and a software application, wherein the control circuit, when locally executing the software application, is configured to: access an image captured by the camera; perform, locally on the portable computing device, an optical character recognition (OCR) on the image and identify a set of text from the image; apply, locally on the portable computing device, a first set of vector modeling rules to at least a subset of key text of the set of text, and generate a first query product vector from the at least the subset of key text; and wirelessly communicate the first query product vector to the product recommendation system without implementing another secondary mode of product identification and without communicating other product information from another secondary mode of product identification; the product recommendation system is configured to receive the first query product vector; access the product vector database; apply a first set of vector evaluation rules relative to the first query product vector in relation to the product vector database; identify, based on the first query product vector, a first product determined to be captured in the image; obtain a first product identifier of the first product; and wirelessly communicate to the portable computing device the first product identifier without communicating other product information of the first product; wherein the control circuit is further configured to: wirelessly receive the first product identifier from the product recommendation system determined based on the first query product vector; access, from the local product database, first product information exclusively corresponding to the first product identifier and comprising at least a first product name; cause at least a subset of the first product information to be displayed on the display; and cause the first product to be virtually added to a virtual cart corresponding to a customer associated with the portable computing device.

Further, some embodiments provide methods of identifying products. At least some of these methods comprise: accessing, by a control circuit of a portable computing device executing a software application, an image captured by a camera of the portable computing device; performing, locally on the portable computing device, an optical character recognition (OCR) on the image and identifying a set of text from the image; applying, locally on the portable computing device, a first set of vector modeling rules to at least a subset of key text of the set of text, and generating a first query product vector from the at least the subset of key text; and wirelessly communicating the first query product vector to a separate product recommendation system without implementing another secondary mode of product identification and without communicating other product information from another secondary mode of product identification; receiving, at the product recommendation system, the first query product vector, and accessing a product vector database that stores thousands of standardized product vectors, wherein each product vector numerically represents textual information on packaging of a respective one of the products; applying a first set of vector evaluation rules relative to the first query product vector in relation to the product vector database, and identifying, based on the first query product vector, a first product determined to be captured in the image; obtaining a first product identifier of the first product; wirelessly communicating to the portable computing device the first product identifier; wirelessly receiving, at the portable computing device, the first product identifier from the product recommendation system determined based on the first query product vector; accessing, from the local product database, first product information exclusively corresponding to the first product identifier and comprising at least a first product name; causing at least a subset of the first product information to be displayed on a display of the portable computing device; and causing the first product to be virtually added to a virtual cart corresponding to a customer associated with the portable computing device.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system to identify products, comprising:
a plurality of portable computing devices operating as network edge components, wherein each portable computing device comprises:

a control circuit;
a wireless transceiver communicatively coupled with the control circuit;
a database memory communicatively coupled with the control circuit and storing a local product database;
a memory communicatively coupled with the control circuit and storing a software application executable by the control circuit; and
a camera;
wherein the control circuit, when executing the software application, is configured to:
   access an image of a first product captured by the camera,
   perform, locally, an optical character recognition (OCR) on the image and identify a set of text from the image;
   apply, locally, a first set of vector modeling rules to at least a subset of key text of the set of text, and generate a first query product vector from the at least the subset of key text;
   wirelessly communicate the first query product vector to a separate product recommendation system without implementing another secondary mode of product identification and without communicating other product information from another secondary mode of product identification;
   wirelessly receive, in response to the communicating of the first query product vector, a first product identifier from the product recommendation system determined based on the first query product vector relative to a product vector database storing standardized product vectors and without receiving other product information corresponding to the first product, wherein each product vector numerically represents textual information on packaging of a respective one of different products;
   access, from the local product database, first product information exclusively corresponding to the first product identifier and comprising at least a first product name;
   cause at least a subset of the first product information to be displayed on a display; and
   cause the first product to be virtually added to a virtual cart corresponding to a customer associated with the portable computing device.

2. The system of claim 1, wherein the control circuit is further configured to:
   wirelessly receive an error command in response to a second query product vector, corresponding to a second image of a second product communicated by the control circuit, is not within a threshold of the standardized product vectors in the product vector database; and
   activate a separate secondary mode of product identification in response to the error command.

3. The system of claim 1, further comprising: the product recommendation system configured to:
   receive the first query product vector;
   access the product vector database;
   apply a first set of vector evaluation rules relative to the first query product vector in relation to the product vector database;
   identify, based on the first query product vector, the first product determined to be captured in the image;
   obtain the first product identifier of the first product; and
   wirelessly communicate to the portable computing device the first product identifier without communicating other product information of the first product.

4. The system of claim 1, further comprising:
the product recommendation system;
a customer database storing customer profiles, wherein each customer profile is associated with one of multiple different customers and comprises purchase history information, customer preference information, and customer payment information corresponding to a respective customer; and
the product vector database;
wherein the product recommendation system in identifying the first product identifier is configured to:
   identify a set of standardized product vectors from the product vector database that are within a threshold variation of the first query product vector;
   obtain a set of product identifiers, wherein each product identifier corresponds to a standardized product vector of the set of standardized product vectors, comprising the first product identifier and at least a second product identifier; and
   access a customer purchase history information corresponding to the customer, and define a ranking to each product associated with a respective one of the set of product identifiers based at least on a variation between the first query product vector and the corresponding standardized vector, and the customer purchase history information;
wherein the product recommendation system is configured to communicate the set of product identifiers and the associated rankings to the portable computing device without communicating other product information of products corresponding to the set of product identifiers.

5. The system of claim 1, wherein the control circuit is configured to:
   receive a set of product identifiers, including the first product identifier identified based on the first query product vector;
   access the local product database and obtain product information for each product identifier of the set of product identifiers, including the first product information;
   cause the product information for each product identifier of the set of product identifiers to be displayed on the portable computing device, including the first product information;
   receive a selection of the first product, by the customer based on the displayed product information for each product identifier of the set of product identifiers; and
   cause, in response to receiving the selection, the virtual adding of the first product to the virtual cart maintained locally on the portable computing device.

6. The system of claim 1, further comprising the product recommendation system, wherein the product recommendation system is configured to:
   apply a set of complementary product rules to product data maintained in a retail product database based on the identification of at least the first product identifier, and identify a set of one or more complementary products that are each at least complementary to the first product;
   obtain corresponding product identifiers for each complementary product of the set of complementary products; and
   communicate the product identifiers of the set of complementary products to the portable computing device.

7. The system of claim 1, wherein the control circuit is configured to:
receive product identifiers of a set of complementary products that are each predicted to be at least complementary to the first product;
access the local product database and obtain product information for each product identifier of the set of complementary products;
cause a first listing to be displayed on the display wherein the first listing comprises the product information for each product identifier of the set of product identifiers to be displayed on the display;
cause a second listing that is separate from the first listing to be displayed on the display, wherein the second listing comprises the product information for each complementary product of the set of complementary products;
receive a selection, by the customer, of a first complementary product of the set of complementary products; and
cause, in response to receiving the selection of the first complementary product, the first complementary product to be virtually added to the virtual cart maintained locally on the portable computing device.

8. The system of claim 1, wherein the control circuit is further configured to:
apply a set of filtering rules to the set of text based on a limited dictionary of predefined text, comprising predefined text present on products offered for sale by a predefined retailer, wherein the limited dictionary is maintained on the portable computing device;
filter the set of text based on the limited dictionary; and
extract, based on the filtering, the subset of key text from the set of text, wherein the subset of key text is less than the set of text and includes text only included in the limited dictionary of the predefined text.

9. The system of claim 8, wherein the control circuit is further configured to:
receive, at the portable computing device, over time dictionary updates of customer relevant text based on evaluations of text associated with products purchased by the customer over time; and
update the limited dictionary of the predefined text maintained on the portable computing device over time based on the customer relevant text and replace one or more text in the limited dictionary of the predefined text with the customer relevant text while maintaining limits of the limited dictionary of the predefined text.

10. The system of claim 1, further comprising the product recommendation system, wherein the product recommendation system is configured to:
evaluate over time purchased products purchased by the customer;
access a retail product database and retrieve OCR text information corresponding to an exterior of each of the purchased products;
repeatedly train over time a text vector model using the OCR text information for each of the purchased products and customizing the text vector model to the customer to provide an updated text vector model; and
repeatedly replace over time the text vector model, maintained locally on the portable computing device and applied as part of the vector modeling rules, with the updated text vector model.

11. A method of identify products, comprising:
accessing, by a control circuit of a portable computing device executing a software application, an image of a first product captured by a camera of the portable computing device;
performing, locally on the portable computing device, an optical character recognition (OCR) on the image and identifying a set of text from the image;
applying, locally on the portable computing device, a first set of vector modeling rules to at least a subset of key text of the set of text, and generating a first query product vector from the at least the subset of key text;
wirelessly communicating the first query product vector to a separate product recommendation system without implementing another secondary mode of product identification and without communicating other product information from another secondary mode of product identification;
wirelessly receiving, at the portable computing device and in response to the communicating of the first query product vector, a first product identifier from the product recommendation system determined based on the first query product vector relative to a product vector database storing standardized product vectors and without receiving other product information corresponding to the first product, wherein each product vector numerically represents textual information on packaging of a respective one of different products;
accessing, from a local product database maintained in the portable computing device, first product information exclusively corresponding to the first product identifier and comprising at least a first product name;
causing at least a subset of the first product information to be displayed on a display of the portable computing device; and
causing the first product to be virtually added to a virtual cart corresponding to a customer associated with the portable computing device.

12. The method of claim 11, further comprising:
wirelessly receiving an error command in response to a second query product vector, corresponding to a second image of a second product communicated by the control circuit, is not within a threshold of the standardized product vectors in the product vector database; and
activating a separate secondary mode of product identification in response to the error command.

13. The method of claim 11, further comprising:
wirelessly receiving the first query product vector;
accessing the product vector database;
applying a first set of vector evaluation rules relative to the first query product vector in relation to the product vector database;
identifying, based on the first query product vector, the first product determined to be captured in the image;
obtaining the first product identifier of the first product; and
wirelessly communicating to the portable computing device the first product identifier.

14. The method of claim 11, further comprising:
identifying, by the product recommendation system, the first product identifier comprising:
identifying a set of standardized product vectors from the product vector database that are within a threshold variation of the first query product vector;
obtaining, from the product vector database, a set of product identifiers, wherein each product identifier of the set of product identifiers corresponds to a standardized product vector of the set of standardized product vectors, comprising the first product identifier and at least a second product identifier;

accessing, through a customer database, a customer purchase history information corresponding to the customer associated with the portable computing device;

defining a ranking to each product associated with a respective one of the set of product identifiers based at least on a variation between the first query product vector and the corresponding standardized vector, and the customer purchase history information; and communicating the set of product identifiers and the associated rankings to the portable computing device without communicating other product information of products corresponding to the set of product identifiers.

15. The method of claim 11, further comprising:

receiving a set of product identifiers, including the first product identifier identified based on the first query product vector;

accessing the local product database and obtaining product information for each product identifier of the set of product identifiers, including the first product information;

causing the product information for each product identifier of the set of product identifiers to be displayed on the display of the portable computing device, including the first product information;

receiving a selection of the first product by the customer based on the displayed product information for each product identifier of the set of product identifiers; and causing, in response to receiving the selection, the virtual adding of the first product to the virtual cart maintained locally on the portable computing device.

16. The method of claim 11, further comprising:

applying a set of complementary product rules to product data maintained in a retail product database based on the identification of at least the first product identifier;

identifying a set of complementary products that are each at least complementary to the first product;

obtaining corresponding product identifiers for each complementary product of the set of complementary products; and communicating the product identifiers of the set of complementary products to the portable computing device.

17. The method of claim 11, further comprising:

receiving product identifiers of a set of complementary products that are each predicted to be at least complementary to the first product;

accessing the local product database and obtaining product information for each product identifier of the set of complementary products;

causing a first listing to be displayed on the display wherein the first listing comprises the product information for each product identifier of the set of product identifiers to be displayed on the display;

causing a second listing that is separate from the first listing to be displayed on the display, wherein the second listing comprises the product information for each complementary product of the set of complementary products;

receiving a selection, by the customer, of a first complementary product of the set of complementary products; and causing, in response to receiving the selection of the first complementary product, the first complementary product to be virtually added to the virtual cart maintained locally on the portable computing device.

18. The method of claim 11, further comprising:

applying a set of filtering rules to the set of text based on a limited dictionary of predefined text, comprising predefined text present on products offered for sale by a predefined retailer, wherein the limited dictionary is maintained on the portable computing device;

filtering the set of text based on the limited dictionary; and extracting, based on the filtering, the subset of key text from the set of text, wherein the subset of key text is less than the set of text and includes text only included in the limited dictionary of the predefined text.

19. The method of claim 18, further comprising:

receiving, at the portable computing device, over time dictionary updates of customer relevant text based on evaluations of text associated with products purchased by the customer over time; and updating the limited dictionary of the predefined text maintained on the portable computing device over time based on the customer relevant text and replace one or more text in the limited dictionary of the predefined text with the customer relevant text while maintaining limits of the limited dictionary of the predefined text.

20. The method of claim 11, further comprising:

evaluating over time purchased products purchased by the customer;

accessing a retail product database and retrieve OCR text information corresponding to an exterior of each of the purchased products;

repeatedly training over time a text vector model using the OCR text information for each of the purchased products and customizing the text vector model to the customer to provide an updated text vector model; and repeatedly replacing over time the text vector model, maintained locally on the portable computing device and applied as part of the vector modeling rules, with the updated text vector model.

* * * * *